US012681629B2

(12) United States Patent
Zheng et al.

(10) Patent No.: US 12,681,629 B2
(45) Date of Patent: Jul. 14, 2026

(54) FUNCTION SIMULATOR DRIVEN BY GRAPHICAL USER INTERFACE PROTOTYPES

(71) Applicant: INTERNATIONAL BUSINESS MACHINES CORPORATION, Armonk, NY (US)

(72) Inventors: Chun Hong Zheng, Beijing (CN); Qun Q Zhang, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/191,862

(22) Filed: Mar. 28, 2023

(65) Prior Publication Data

US 2024/0329820 A1 Oct. 3, 2024

(51) Int. Cl.
*G06F 3/04847* (2022.01)
*G06N 3/045* (2023.01)
(Continued)

(52) U.S. Cl.
CPC ......... *G06F 3/04847* (2013.01); *G06N 3/045* (2023.01); *G06N 3/0475* (2023.01); *G06N 3/094* (2023.01)

(58) Field of Classification Search
CPC .... G06F 3/04847; G06N 3/094; G06N 3/045; G06N 3/0475
See application file for complete search history.

(56) References Cited

U.S. PATENT DOCUMENTS 8,302,072 B2 10/2012 Chandhoke et al.
8,819,629 B2 8/2014 Sherrill
(Continued)

FOREIGN PATENT DOCUMENTS

CN 113986251 A 1/2022
WO 2021013655 A1 1/2021

OTHER PUBLICATIONS

Zhao, Tianming, et al. "Guigan: Learning to generate gui designs using generative adversarial networks." 2021 IEEE/ACM 43rd International Conference on Software Engineering (ICSE). IEEE (Year: 2021).*

(Continued)

*Primary Examiner* — John T Repsher, III
(74) *Attorney, Agent, or Firm* — Harrity & Harrity, LLP

(57) ABSTRACT

An execution-step sequence for a first graphical user interface can be determined. A second graphical user interface can include: first panel in which the first graphical user interface is presented; a second panel including a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed. Responsive to the user selecting the first user selectable component, an execution-step in the execution-step sequence can be executed, a result of the executing the execution-step can be depicted by redrawing the first graphical user interface, and component status data indicating the execution-step in the execution-step sequence that was executed can be added to the third panel.

20 Claims, 14 Drawing Sheets

(51) Int. Cl.
  *G06N 3/0475* (2023.01)
  *G06N 3/094* (2023.01)

(56) References Cited

U.S. PATENT DOCUMENTS

| | | | | |
|---|---|---|---|---|
| 10,218,803 | B2 | 2/2019 | Ameling | |
| 10,489,126 | B2 | 11/2019 | Kumar et al. | |
| 2004/0027373 | A1* | 2/2004 | Jacquot | G06F 9/45512 |
| | | | | 715/730 |
| 2009/0259988 | A1* | 10/2009 | Hertenstein | G06F 8/38 |
| | | | | 717/108 |
| 2012/0204102 | A1* | 8/2012 | Gwin | G06F 40/186 |
| | | | | 715/253 |
| 2016/0071179 | A1* | 3/2016 | Babcock | G06F 9/453 |
| | | | | 715/201 |
| 2019/0317739 | A1 | 10/2019 | Turek et al. | |
| 2020/0043363 | A1* | 2/2020 | Grossman | G09B 19/0053 |
| 2021/0264280 | A1* | 8/2021 | Bonakdar Sakhi | G06N 3/047 |
| 2022/0130380 | A1 | 4/2022 | Touati | |
| 2022/0350578 | A1 | 11/2022 | Kulkarni et al. | |
| 2023/0083894 | A1* | 3/2023 | Duggal | G06F 8/316 |
| | | | | 717/107 |
| 2023/0129431 | A1* | 4/2023 | Sollami | G06F 9/451 |
| | | | | 715/764 |

OTHER PUBLICATIONS

Chen, C. et al., "From UI Design Image to GUI Skeleton: a Neural Machine Translator to Bootstrap Mobile GUI Implementation," InProceedings of the 40th International Conference on Software Engineering, May 27, 2018, pp. 665-676.

Deka, B, et al., "Rico: A mobile app dataset for building data-driven design applications," InProceedings of the 30th Annual ACM Symposium on User Interface Software and Technology, Oct. 20, 2017, pp. 845-854.

Kumar, R. et al., "Webzeitgeist: design mining the web," InProceedings of the SIGCHI Conference on Human Factors in Computing Systems, Apr. 27, 2013, pp. 3083-3092.

Ritchie, D. et al., "d. tour: Style-based Exploration of Design Example Galleries," InProceedings of the 24th Annual ACM Symposium on User Interface Software and Technology, Oct. 16, 2011, pp. 165-174.

Bao, L. et al., "Tracking and Analyzing Cross-Cutting Activities in Developers' Daily Work," In2015 30th IEEE/ACM International Conference on Automated Software Engineering (ASE), Nov. 9, 2015,pp. 277-282, IEEE.

Mell, P. et al., The NIST Definition of Cloud Computing, National Institute of Standards and Technology, U.S. Dept. of Commerce, Special Publication 800-145, Sep. 2011, 7 pg.

"Convolutional neural network", Wikipedia—The Free Encyclopedia, Mar. 31, 2025, 40 pages, https://en.wikipedia.org/wiki/Convolutional_neural_network.

Choi et al., "StarGAN: Unified Generative Adversarial Networks for Multi-Domain Image-to-Image Translation", Korea University, Sep. 21, 2018, 15 pages.

Yu et al., "SeqGAN: Sequence Generative Adversarial Nets with Policy Gradient", Machine Learning, arXiv:1609.05473, Aug. 25, 2017, 11 pages.

* cited by examiner

100

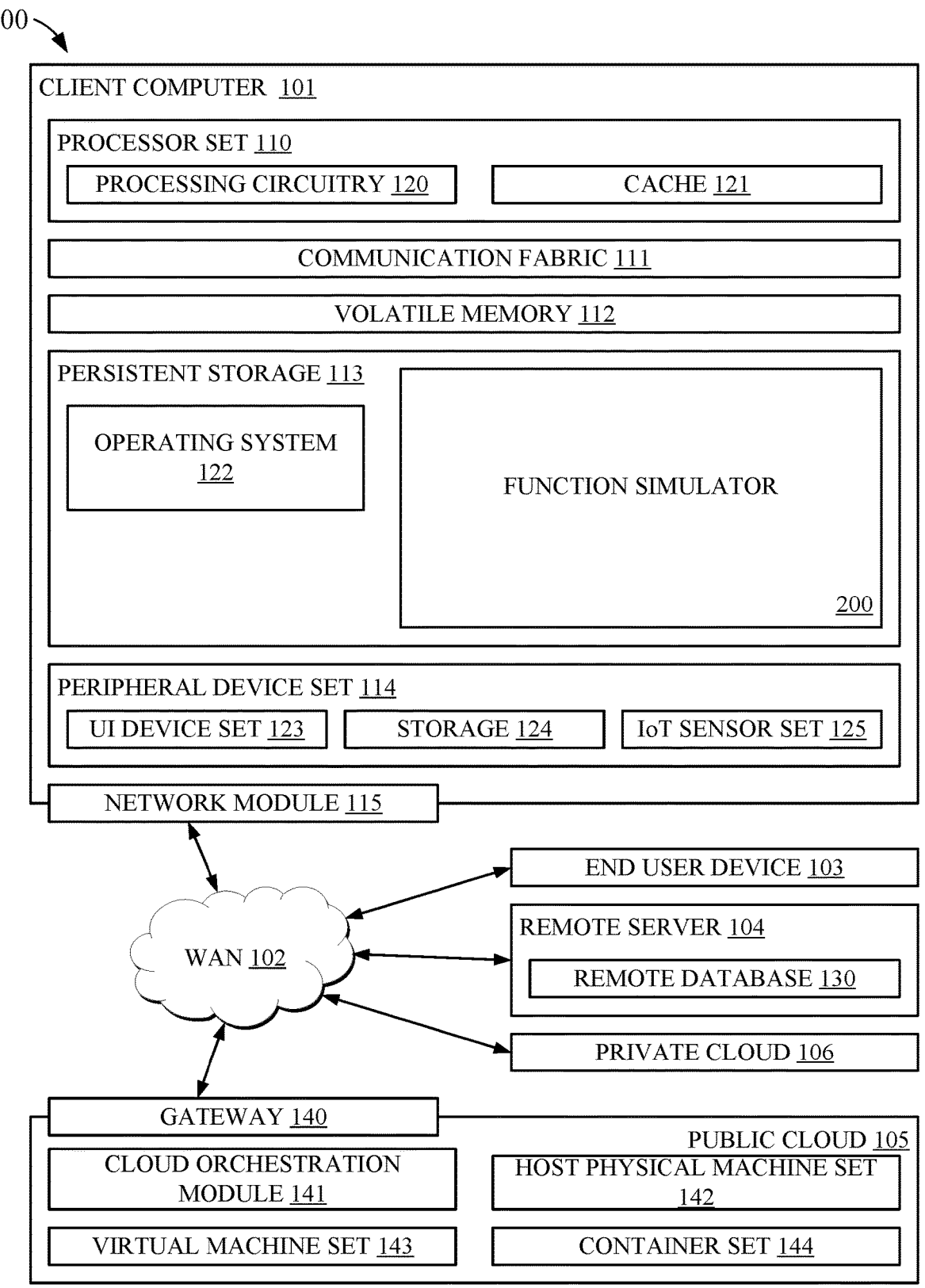

CLIENT COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

FUNCTION SIMULATOR

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

GENERATOR TRAINING

DISCRIMINATOR TRAINING

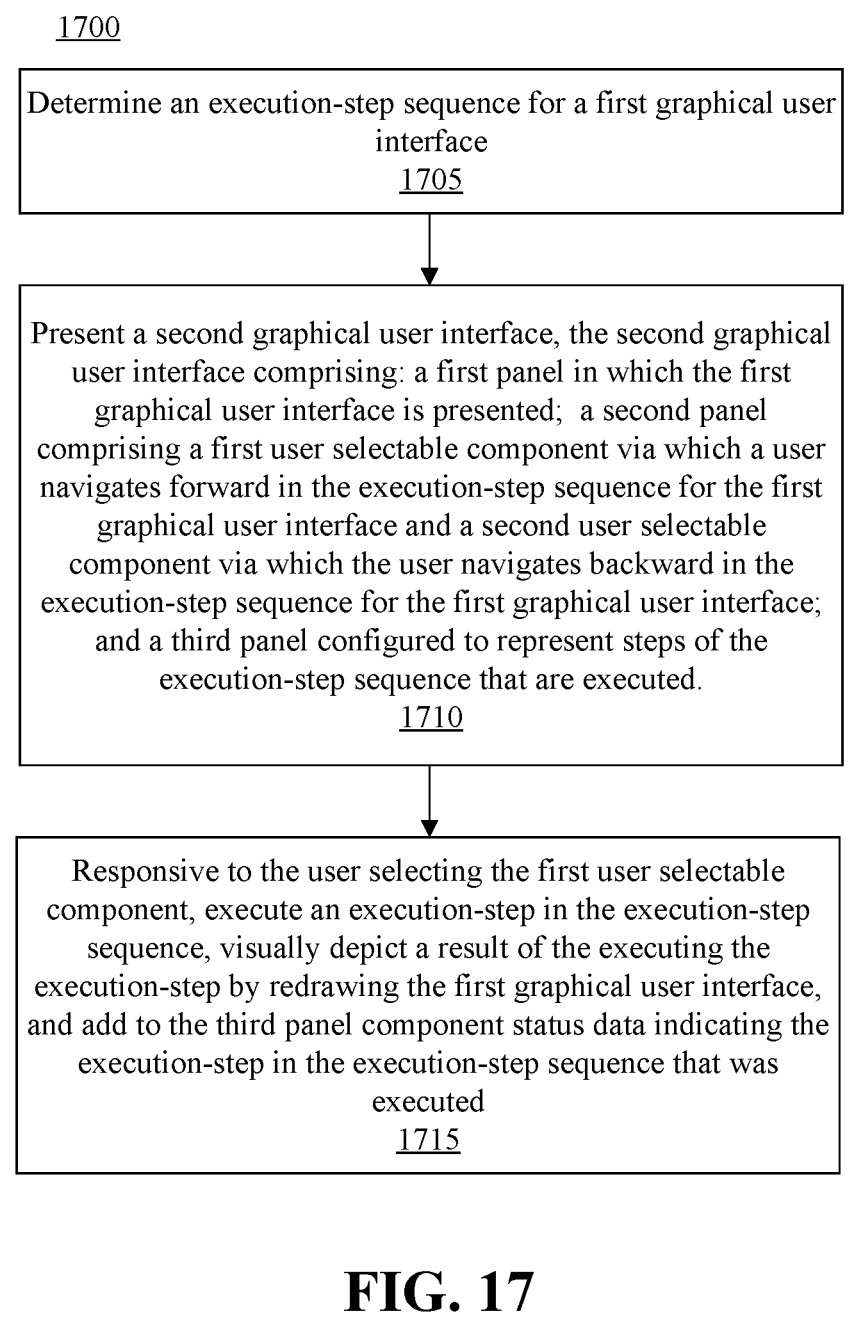

1700

Determine an execution-step sequence for a first graphical user interface
1705

Present a second graphical user interface, the second graphical user interface comprising: a first panel in which the first graphical user interface is presented; a second panel comprising a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed.
1710

Responsive to the user selecting the first user selectable component, execute an execution-step in the execution-step sequence, visually depict a result of the executing the execution-step by redrawing the first graphical user interface, and add to the third panel component status data indicating the execution-step in the execution-step sequence that was executed
1715

FIG. 17

FUNCTION SIMULATOR DRIVEN BY GRAPHICAL USER INTERFACE PROTOTYPES

BACKGROUND

The present invention relates to graphical user interfaces (GUIs), and more specifically, to (GUI) design prototypes.

GUI design prototypes oftentimes are generated for applications that are being developed. GUI design prototypes provide application team members a sense of how users will interact with the application, even before application development is complete.

SUMMARY

A method includes determining, using a processor, an execution-step sequence for a first graphical user interface. The method also can include presenting a second graphical user interface. The second graphical user interface can include: a first panel in which the first graphical user interface is presented; a second panel including a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed. The method also can include, responsive to the user selecting the first user selectable component, executing an execution-step in the execution-step sequence, visually depicting a result of the executing the execution-step by redrawing the first graphical user interface, and adding to the third panel component status data indicating the execution-step in the execution-step sequence that was executed.

A system includes a processor programmed to initiate executable operations. The executable operations include determining an execution-step sequence for a first graphical user interface. The executable operations also can include presenting a second graphical user interface. The second graphical user interface can include: a first panel in which the first graphical user interface is presented; a second panel including a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed. The executable operations also can include, responsive to the user selecting the first user selectable component, executing an execution-step in the execution-step sequence, visually depicting a result of the executing the execution-step by redrawing the first graphical user interface, and adding to the third panel component status data indicating the execution-step in the execution-step sequence that was executed.

A computer program product includes a computer readable storage medium having program code stored thereon. The program code is executable by a data processing system to initiate operations. The operations include determining an execution-step sequence for a first graphical user interface. The operations also can include presenting a second graphical user interface. The second graphical user interface can include: a first panel in which the first graphical user interface is presented; a second panel including a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed. The operations also can include, responsive to the user selecting the first user selectable component, executing an execution-step in the execution-step sequence, visually depicting a result of the executing the execution-step by redrawing the first graphical user interface, and adding to the third panel component status data indicating the execution-step in the execution-step sequence that was executed.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 1 is a block diagram illustrating an example of a network data processing system.

FIG. 17 is a flowchart illustrating an example of a method of facilitating user interaction with a graphical user interface.

DETAILED DESCRIPTION

Figure 2:
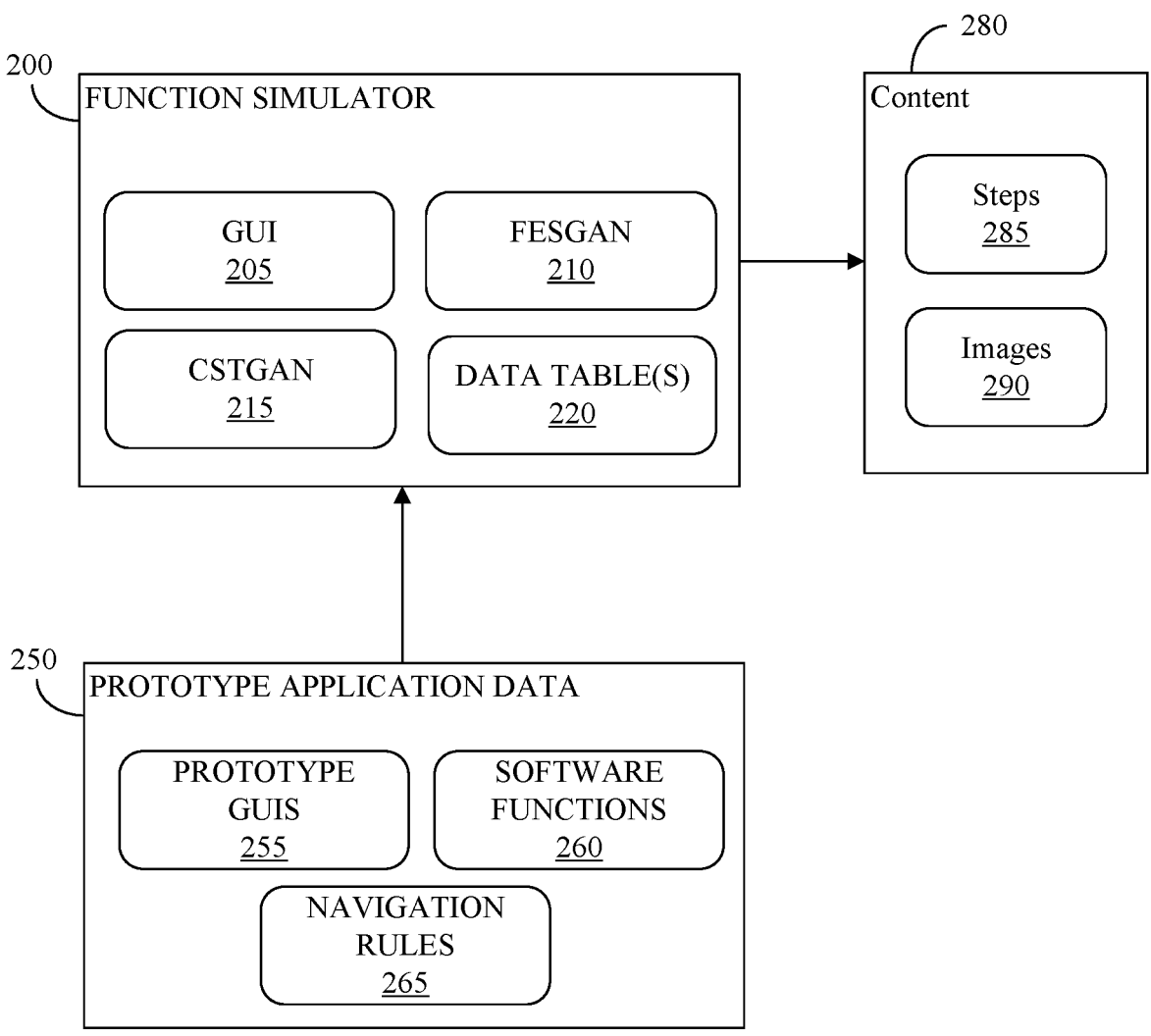
FIG. 2 is a block diagram illustrating example architecture for a function simulator.

This disclosure relates to graphical user interfaces (GUIs), and more particularly, to (GUI) design prototypes.

The arrangements described herein are directed to computer technology, and provide an improvement to computer technology. Specifically, the present arrangements improve understanding of how GUI prototypes work, improve development of GUI prototypes, and improve use of machine learning for optimizing determination of execution-step sequences and optimizing redrawing GUI prototypes.

In accordance with the inventive arrangements disclosed herein, a function simulator can determine an execution-step sequence for a prototype GUI, for example using Function Execution-step Generative Adversarial Networks (FES-GAN) that are trained using machine learning and artificial intelligence (AI). Function simulator can present another GUI. The other GUI can include a prototype GUI panel in which the prototype GUI is presented, a function simulation panel via which a user can execute steps in the execution step sequence, and an executed steps panel that presents the steps that have been executed. Via the function simulation panel the user can navigate the executable steps in the executable step sequence, both forward and backward, and the executed steps panel can track the user's progress, indicating the execution-steps executed by the user.

Each time an executable-step is executed, the prototype GUI can be redrawn to visually depict a result of the executing the execution-step, for example using Component Status Transition Generative Adversarial Networks (CST-GAN) that are trained using machine learning and AI. Moreover, each time the prototype GUI is redrawn, an image of the prototype GUI in that state can be saved to persistent storage and correlated with the execution-step resulting in that state.

Based on the executed steps presented in executed steps panel and the saved images, function simulator can output content. The content can include the executed steps and, for each executed step, the corresponding image. Such content can be incorporated into user training material, for example a user manual.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as function simulator 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a block diagram illustrating example architecture for function simulator 200. Function simulator 200 can include a graphical user interface (GUI) 205, Function Execution-step Generative Adversarial Networks (FES-GAN) 210, Component Status Transition Generative Adversarial Networks (CSTGAN) 215, and one or more data tables 220 (e.g., in a database).

Function simulator 200 can receive, as input data, prototype application data 250. Prototype application data 250 can include prototype GUIs 255, software functions 260 to be executed in response to user interactions with the prototype GUIs 255, and navigation rules 265 that define navigation steps within prototype GUIs 255. Prototype GUIs 255 can be implemented in various code (e.g., html, css, qml, Javascript®, Python, etc.) and include GUI components (e.g., buttons, icons, etc.).

Prototype application data 250 can be data for an application for which content is to be generated, though the application may not be complete. In illustration, designs for various GUIs may have been created, but the GUIs may not have yet been implemented the code of the application. Nonetheless, users, such as content designers, often compose procedures for using an application so that the procedures are complete by the time the application is complete. Such procedures typically are dependent on the application's GUIs. Function simulator 200 can process prototype application data 250, enabling users to interact with the prototype GUIs 255 and generate corresponding content 280.

Function simulator 200 can export the content. The content can comprise, for example, a sequence of steps 285 to be executed when using a prototype GUI 255 and images 290 corresponding to those steps 285, as will be further described.

Figure 3:
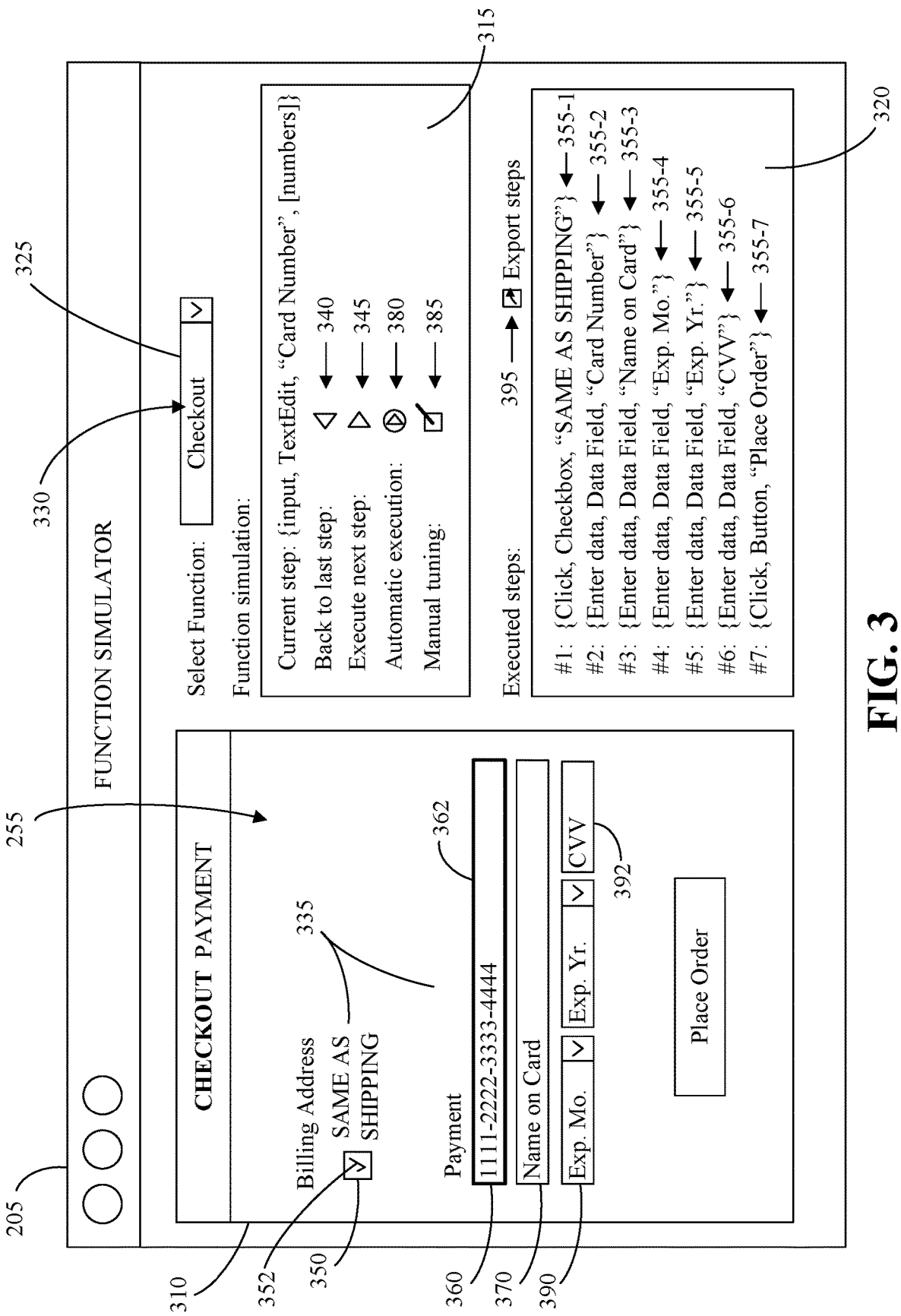
FIG. 3 is a depicts an example graphical user interface (GUI) presented by the function simulator.

FIG. 3 depicts an example GUI 205 presented by function simulator 200. GUI 205 can comprise a prototype GUI panel 310, a function simulation panel 315, an executed steps panel 320 and a function selector 325, all of which can be simultaneously presented on a display, for example in a single view (e.g., window), or presented in a plurality of views (e.g., windows).

A user can use the function selector 325 to select a target function 330, for example "Checkout." Prototype GUI panel 310 can present a prototype GUI 255 corresponding to target function 330 selected by a user using function selector 325. For example, responsive to the user selecting a "Checkout," prototype GUI panel 310 can present a prototype GUI 255 for completing a checkout process. In this example the prototype GUI 255 presents GUI components 335 for billing information, but the present arrangements are not limited in this regard. GUI components 335 can include, for example, data entry fields, check boxes, buttons, etc. Function simulator 200 can store an initial image of the prototype GUI 255 prior to steps being executed.

Function simulator 200 can load software functions 260 and navigation rules 265 pertaining to prototype GUI 255 and GUI components 335. Based on the software functions 260 and navigation rules 265, using FESGAN 210, function simulator 200 can determine an execution-step sequence for navigating the prototype GUI, for example as described in FIG. 5. The execution-step sequence can include each step to be executed for completing data entry into prototype GUI 255. Function simulator 200 can store the determined execution-step sequence to a data table 220.

The user can interact with function simulation panel 315 to execute steps in the execution-step sequence. For example, function simulation panel 315 can include a plurality of user selectable GUI components selectable by a user to navigate through execution-steps. In illustration, function simulation panel 315 can include a back button 340, a next button 345, and an automatic execution button 380. Function simulation panel also can include a manual tuning button 385.

Prototype GUI panel 310 can present prototype GUI 255 in a state where prototype GUI 255 is redrawn to correspond to the steps that have been executed. Executed steps panel 320 can depict the progression of execution-steps through the current point in the determined execution-step sequence.

A user can select back button 340 to navigate back to a preceding step or select next button 345 to navigate forward to execute to a next step. Responsive to each navigation step, using CSTGAN 215, function simulator 200 can redraw prototype GUI 255 to visually depict a result of the corresponding execution-step on the prototype GUI 255 according to the software function defined for that execution-step, and function simulator 200 can store, for example to persistent storage 113, an image of prototype GUI 225 as redrawn.

In one or more arrangements, function simulator 200 can indicate a GUI component pertaining to a present execution-step into which data is to be entered. In illustration, if the user navigates forward to an execution-step by selecting button 345, and the next execution-step is a selection of a checkbox 350 to add a checkmark to the checkbox 350, function simulator 200 can add emphasis to checkbox 350 (e.g., highlight checkbox 350, change a color of a border 362 of checkbox 350, increase the line thickness of the border 362 of checkbox 350, etc.). The user can choose to select checkbox 350 to add a checkmark 352 to checkbox 350, or not. If the user selects checkbox 350, function simulator 200 can use CSTGAN 215 to redraw prototype GUI 255 with a checkmark 352 added the checkbox 350. An image of prototype GUI 255 with the checkmark 352 added can be stored to persistent storage 113. If the user again selects checkbox 350 to remove checkmark 352, function simulator 200 can use CSTGAN 215 to redraw prototype GUI 255 without checkmark 352 in checkbox 350. An image of prototype GUI 255 without the checkmark 352 can be stored to persistent storage 113.

Further, responsive to completion of each navigation step, function simulator 200 can add to executed steps panel 320 component status data 355-1 indicating the execution-step in the determined execution-step sequence that was executed. In illustration, function simulator 200 can add component status data 355-1 to a data table 220, and function simulator 200 can present in executed steps panel 320 component status data 355-1 contained in that data table 220. The data table 220 to which component status data 355 can be the same data table 220 to which the determined execution-step sequence is stored, or another data table 220.

By way of example, if selection of the next button 345 executes a first execution-step in the determined execution-step sequence, and that step selects the checkbox 350 (e.g., to add a checkmark), function simulator 200 can add to executed steps panel 320 the component status data 355-1 indicating a step identifier (e.g., "#1"), an action (e.g., "Click"), an indicator of the GUI component on which the step is performed (e.g., "Checkbox"), and information describing the GUI component (e.g., "SAME AS SHIP-PING"). The present arrangements are not limited to this example, and other component status data can be entered by function simulator 200 into executed steps panel 320.

Responsive to the user again selecting the next button 345 to navigate forward to execute to the next step, function simulator 200 can emphasize the next GUI component pertaining to the next execution-step in the determined execution-step sequence. The user can enter data into payment field 360. In response, function simulator 200 can add to executed steps panel 320 component status data 355-2 indicating that execution-step that was executed. Function simulator 200 can use CSTGAN 215 to redraw prototype GUI 255 with the data added to payment field 360, and store that image 290.

Responsive to the user again selecting the next button 345 to navigate forward to execute to the next step, function simulator 200 again can emphasize a next GUI component (e.g., a "Name on Card" field 370) pertaining to a next execution-step in the determined execution-step sequence. The user can enter data into field 370. In response, function simulator 200 can add to executed steps panel 320 component status data 355-3 indicating that execution-step that was executed. Function simulator 200 can use CSTGAN 215 to redraw prototype GUI 255 with the data added to field 370, and store that image 290. Accordingly, each image 290 can depict the prototype GUI 255 in a state resulting from the corresponding execution-step.

The process can continue until the user has navigated each of the execution-steps in the determined execution-step sequence, and each of those execution-steps are indicated in the executed steps panel 320. Each time an execution-step is executed, function simulator can redraw prototype GUI 255 to depict the state of prototype GUI 255 corresponding to the executed steps. Accordingly, executed steps panel 320 can depict component status data 335-1, 355-2, 355-3, 355-4, 355-5, 355-6, 355-7 for the progression of execution-steps through the current point in the determined execution-step sequence, and prototype GUI panel 310 can depict the prototype GUI 225 at that point.

At any point the user can select back button 340 to undo a previously executed step, and thus navigate backward. In this regard, the user can select back button 340 a plurality of times to sequentially undo a plurality of execution-steps in an order that is reverse to the order in which the execution-steps were executed. Each time a previously executed step is undone, function simulator 200 can remove data previously entered into the corresponding GUI component and remove the corresponding component status data 355 entered into the executed steps panel 320 data for that execution-step. In this regard, function simulator 200 can remove the component status data 355 for that execution-step from the data table 220. Further, function simulator 200 can redraw prototype GUI 255 to depict a state of the prototype GUI 255 immediately prior to the execution-step that was removed.

A user can select an automatic execution button 380 in the function simulation panel 315 to automatically execute each of the steps in the determined execution-step sequence. In response, function simulator 200 can execute each of the steps in sequential order. For each step, function simulator can automatically enter data into the corresponding GUI component, for example using test data stored in data table(s) 220. In response to each step being executed, function simulator 200 can perform a respective redraw of prototype GUI 255 in accordance with the executed step, and add corresponding component status data 355 for the respective executed step. In one or more arrangements, a user setting (not shown) can be provided via which the user can specify a duration of time between the execution of each successive step. This can facilitate user tracking of the steps as they are executed.

A user can select a manual tuning button 385 in the function simulation panel 315 to permit the user to tune the execution-steps of the execution-step sequence (i.e., change one or more execution-steps, change on order of one or more execution-steps, delete one or more execution-steps and/or add one or more execution-steps). In illustration, assume that after data is entered into payment field 360 the determined execution-step sequence next enters data in an "Exp. Mo." field 390, but the user desires the next step to be entering data in the "Name on Card" field 370. The user can select the back button 340 to undo the step entering data in the "Exp. Mo." field 390. The user can select the manual tuning button 385, and manually enter data into the "Name on Card" field 370. In response, function simulator 200 can redraw prototype GUI 255 to depict the manually entered data, add a new step to the execution-step sequence corresponding to the manual data entry, and generate component status data 355-3 corresponding to the manual entry. Function simulator 200 can add the new execution-step immediately after the execution-step preceding the manual entry (before the canceled step), which in this example is the execution-step for entering data into the payment field 360. Function simulator can update data table(s) 220 to add the new execution-step to the stored execution-step sequence and to add the component status data 355-3 immediately following component status data 355-2.

As another example, a user can re-order the determined execution-steps using executed steps panel 320. In illustration, the user can select the manual tuning button 385, select a component status data 355 in executed steps panel 320, and move that component status data 355 to a desired position in the executed steps panel 320. For instance, the user can select component status data 355-6 and move it immediately after component status data 355-3. In response, function simulator 200 can rearrange the sequence of steps in the execution-step sequence to correspond to the user placement of the component status data 355-6, and update data table 220 accordingly. Accordingly, the execution-step sequence then will proceed from entering data in the "Name on Card" field 370 to entering data in the "CVV" field 392. In one or more arrangements, rather than editing the execution-step sequence in the executed steps panel 320, responsive to selection of the manual tuning button 385, function simulator 200 can present a pop-up window (not shown) via which the user can modify the execution-step sequence.

As a further example, a user can delete a step from the execution-step sequence. For example, assume the user desires to delete the step corresponding to checkbox 350. The user can delete the component status data 355-1 from executed steps panel 320 (or the pop-up window). In response, function simulator 200 can delete the corresponding execution-step from the execution-step sequence and update data table 220 accordingly.

Executed steps panel 320 can include an export steps button 395. Responsive to the user selecting the export steps button 395, function simulator 200 can export content. The content can include, for example, the current execution-step sequence (e.g., steps 285), which may or may not have been manually changed by the user as previously described. In addition, function simulator 200 can export images of the prototype GUI 255 (e.g., images 290) as redrawn for each of the steps. In illustration, function simulator 200 can export the executed steps and images to a word processing document, wherein each image is presented with (e.g., appended to) the executed step to which the image corresponds. Further, function simulator 200 can export with the executed steps descriptions of the executed steps that are parameterized for any user inputs. The information exported by function simulator 200 can be included in an instruction manual pertaining to use of the application for which prototype GUI 255 is to be included.

The process described for FIG. 3 can be performed for each of a plurality of prototype GUIs 255. In illustration, the process can be performed for all prototype GUIs 255 provided for an application.

Figure 4:
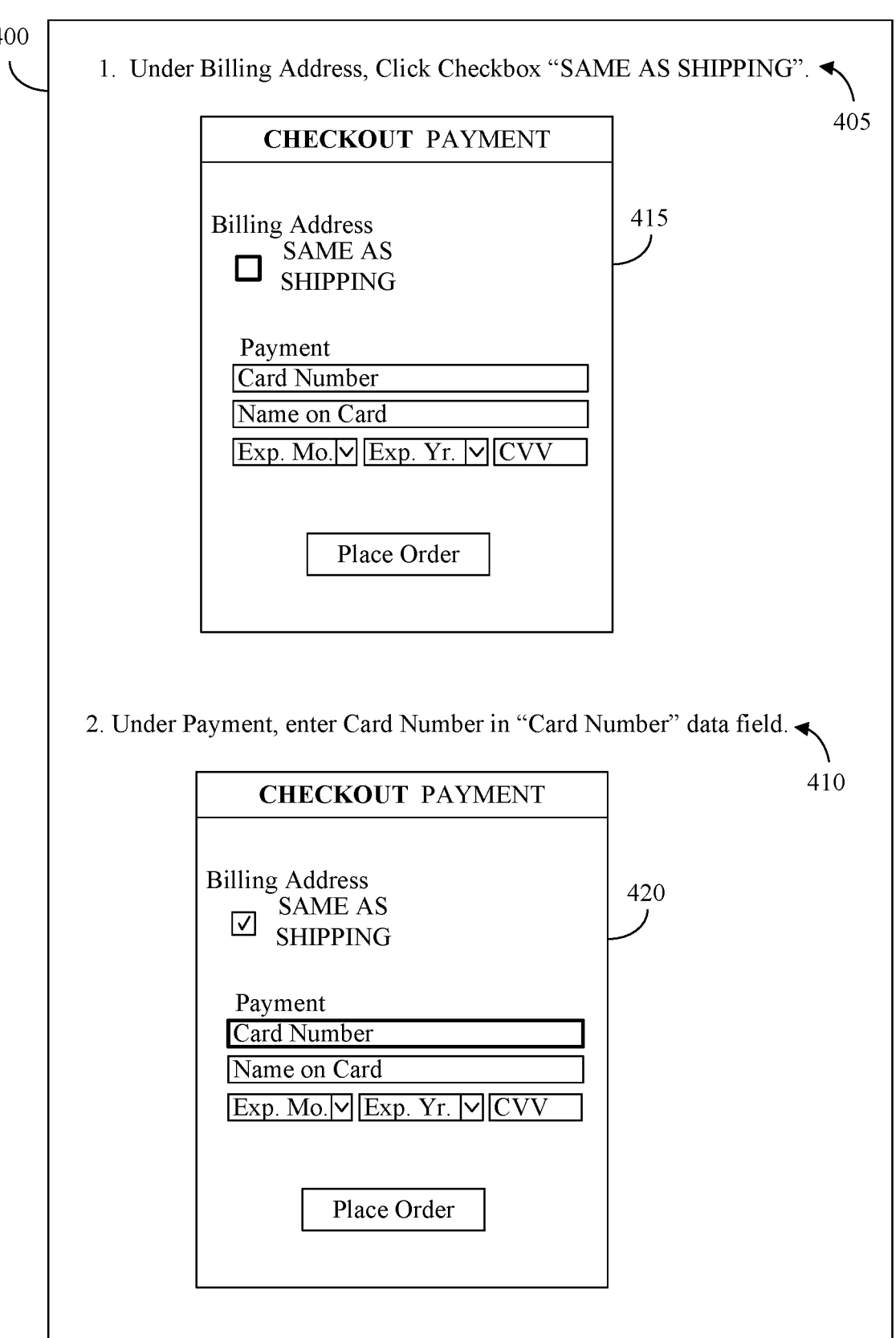
FIG. 4 depicts an example of content exported by the function simulator 200.

FIG. 4 depicts an example of content 400 exported by function simulator 200. Content 400 can include a plurality of steps 405, 410 to be performed by a user using the application incorporating prototype GUI 255. Content 400 also can include, for each step 405, 410, a respective image 415, 420 corresponding to each of the plurality of step 405, 410. As noted, each image 415, 420 can be an image redrawn by function simulator 200 for the corresponding step 405, 410.

Figure 5:
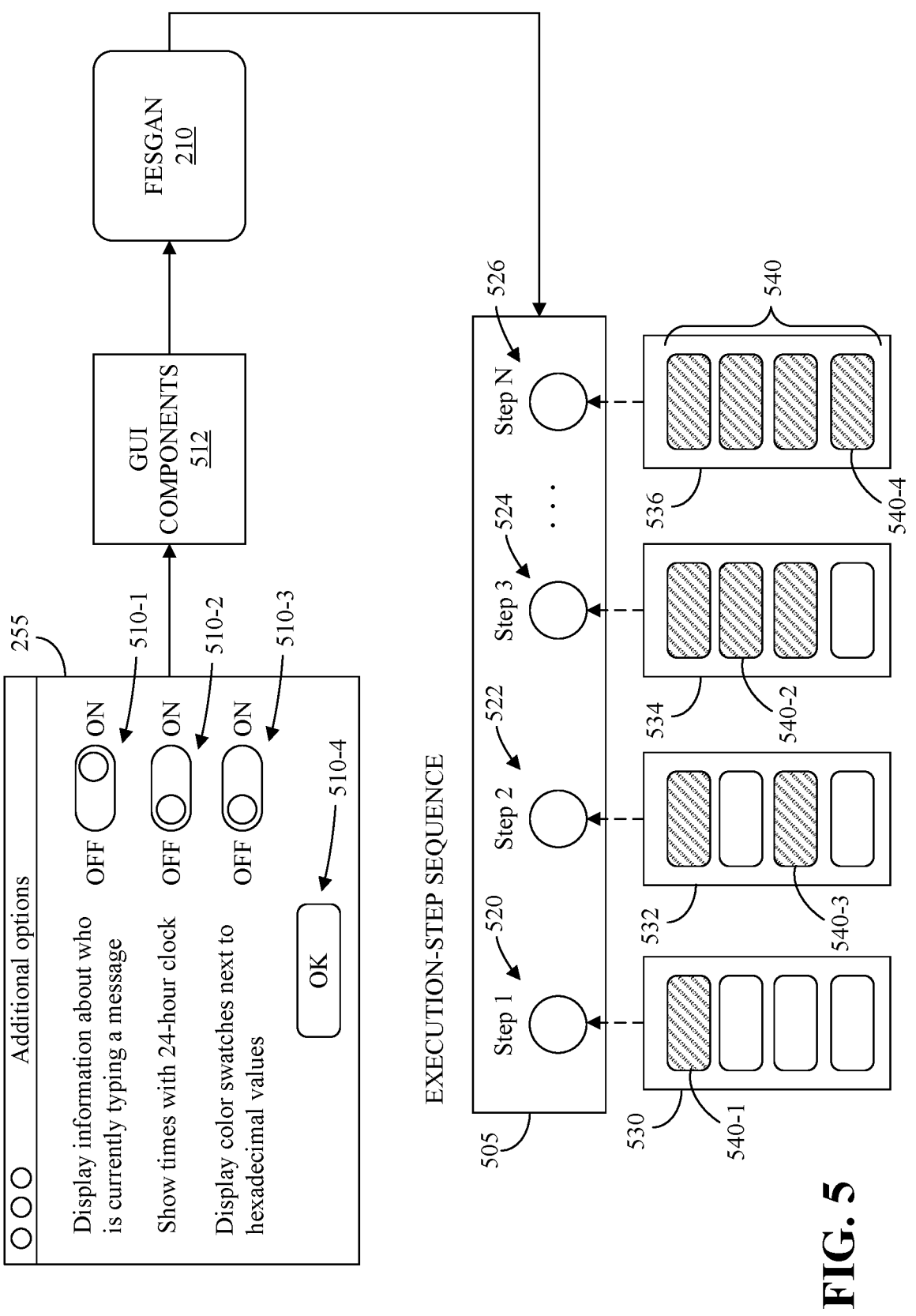
FIG. 5 depicts an example flow diagram for determining an execution-step sequence.

FIG. 5 depicts an example flow diagram for function simulator 200 determining an execution-step sequence 505. Function simulator 200 can process prototype GUI 255 and identify GUI components 510-1, 510-2, 510-3, 510-4, contained in prototype GUI 255, wherein the GUI components 510-1, 510-2, 510-3, 510-4 are configured to receive user inputs and/or receive data from a user. Function simulator 200 can provide a listing 512 of the identified GUI components 510, as well as data indicating their relationships to one another, to FESGAN 210. FESGAN 210 can process the listing 512 of the identified GUI components 510 and data. Based on such processing, FESGAN 210 can determine and generate an execution-step sequence 505 comprising a plurality of steps 520, 522, 524, 526. Each execution-step 520-526 can indicate a respective GUI component 510 that is executed and by what type of operation (e.g., click, data entry, etc.) with or without user input. For example, step 520 can correspond to GUI component 510-1, step 522 can correspond to GUI component 510-2, step 524 can correspond to GUI component 510-3, and step 526 can correspond to GUI component 510-4. Function simulator 200 can store execution-step sequence 505 to a data table 220.

For each of the plurality of steps 520, 522, 524, 526, function simulator 200 can generate a respective component status table 530, 532, 534, 536, and store the component status tables 530-536 to data tables 220. Via component status tables 530-536, function simulator 200 can track the status of each GUI component 510, for example whether the GUI component has been selected, received data, etc. In illustration, each component status table 530-536 can include a plurality of fields 540, with each field 540 representing a respective one of the identified GUI components 510. For example, field 540-1 can correspond to GUI component 510-1, field 540-2 can correspond to GUI component 510-2, field 540-3 can correspond to GUI component 510-3, and field 540-4 can correspond to GUI component 510-4.

FESGAN 210 can initialize component status table 530 prior to or after determining step 520. In response to determining step 520, FESGAN 210 can update component status table 530 to indicate a status of a GUI component 510 resulting from step 520. In illustration, field 540-1 can be updated to indicate that step 520 receives a user input for the GUI component 510 represented by field 540-1. Prior to or after determining step 522, FESGAN 210 can copy component status table 530 for the immediately prior step 520 to create component status table 532. In response to determining step 522, FESGAN 210 can update component status table 532 to indicate a status of a GUI component 510 resulting from step 522. In illustration, field 540-3 can be updated to indicate that step 522 receives a user input for the GUI component 510 represented by field 540-3. Prior to or after determining step 524, FESGAN 210 can copy component status table 532 for the immediately prior step 522 to create component status table 534. In response to determining step 524, FESGAN 210 can update component status table 534 to indicate a status of a GUI component 510 resulting from step 524. In illustration, field 540-2 can be updated to indicate that step 524 receives a user input for the GUI component 510 represented by field 540-2. The process can continue for each step 520-526 that is generated. Accordingly, function simulator 200 can track and record the status (e.g., data received, cleared user input, etc.) of the GUI components 510 within a component status table for each respective step 520-526. The component status tables 530, 532, 534, 536 can be updated in real time in response to the user entering data into, deleting data from, or changing data for one or more GUI components 510.

The process described for FIG. 5 can be performed for each of a plurality of prototype GUIs 255. In illustration, the process can be performed for all prototype GUIs 255 provided for an application.

Figure 6:
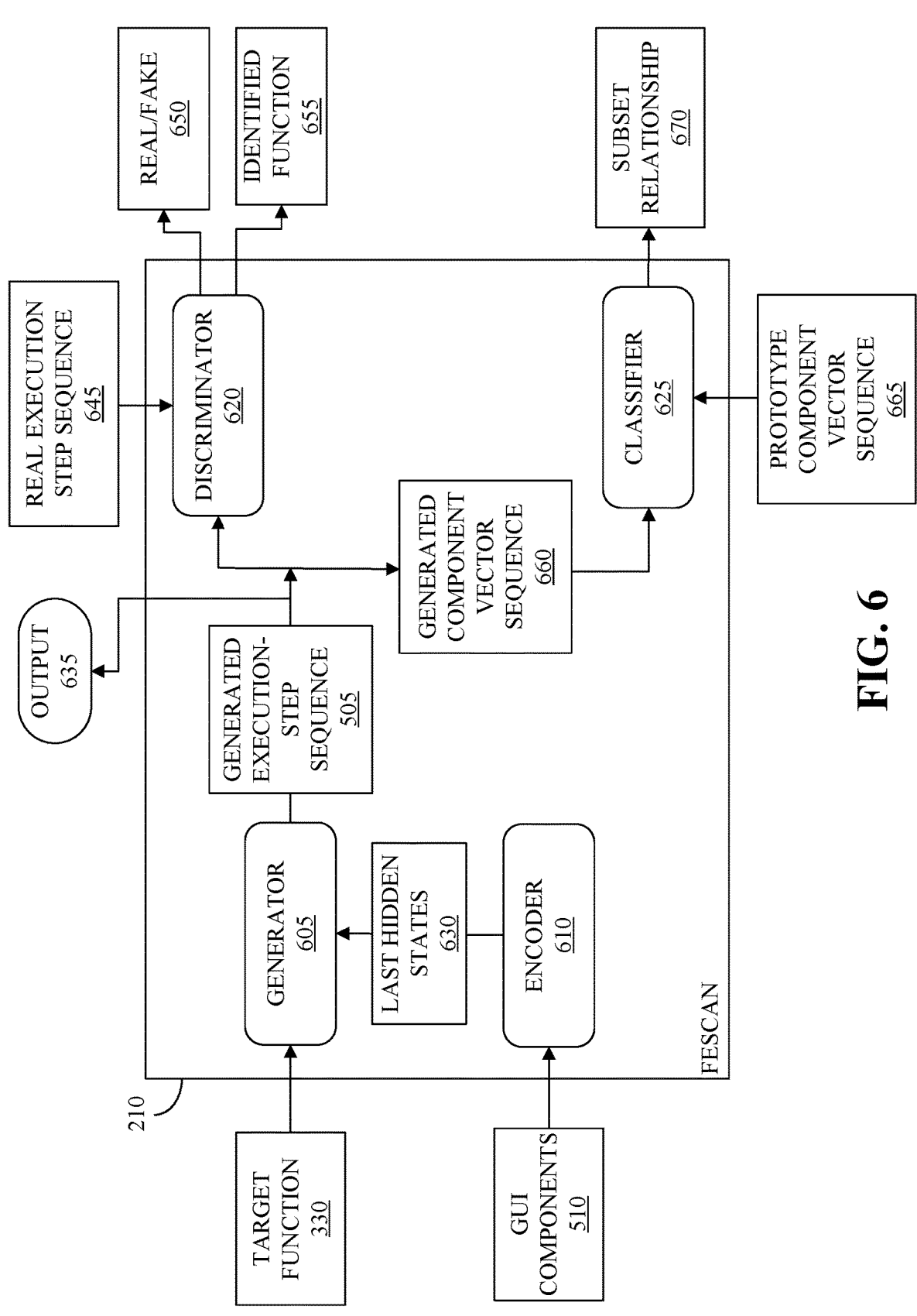
FIG. 6 is a block diagram illustrating an example of Function Execution-step Generative Adversarial Networks (FESGAN).

FIG. 6 is a block diagram illustrating an example FESGAN 210. FESGAN 210 can formulate an execution-step generation task by selecting a list of existing execution-steps to compose a likely execution-step sequence for a target software function, wherein each execution-step applies to a respective GUI component 510 depicted in an input prototype GUI 255.

FESGAN 210 can include a generator 605 and an encoder 610 cooperatively configured to generate execution-step sequence 505 for GUI components 510 and the target function 330. Specifically, the generated execution-step sequence 505 can be an execution-step sequence determined by FESGAN 210 to have highest probability of being the proper execution-step sequence for prototype GUI 255.

FESGAN 210 also can include a discriminator 620 and a classifier 625, which can be used with the encoder 610 and generator 605 to train FESGAN 210, using machine learning and artificial intelligence (AI), to improve accuracy of the generator 605 at generating execution-step sequences 505.

FESGAN 210 can be based on a Sequence Generative Adversarial Network (SeqGAN), which is a variant of a Generative Adversarial Network (GAN) suitable for generating sequences from discrete tokens. FESGAN 210, however, includes additional components, such as encoder 610 and classifier 625, and performs steps not performed by SeqGAN. For example, FESGAN 210 can augment generator 605 to receive a vector representing target function 330 and a last hidden state 630 of encoder 610, which generator 605 can use as an initial hidden state of generator 605. FESGAN 210 also can augment discriminator 620 to concurrently identify a software function of an input execution-step sequence. FESGAN 210 also can include a component-retrieving process that retrieves corresponding component vectors of GUI components 510 for generated execution-steps based on a preset step-component mapping table, which can be included in data tables 220. Further, FESGAN 210 can extend an action-value function to cooperate with adversarial training of generator 605.

Encoder 610 can comprise, for example, a Long Short-Term Memory (LSTM) artificial neural network (ANN), which can be trained using machine learning and AI. Encoder 610 can receive from function simulator 200 a list of GUI components 510 contained in prototype GUI 255. Encoder 610 can represent each GUI component 510 as a GUI-component vector, for example using one-hot encoding. For a list of GUI components 510, encoder 610 can output a last hidden state 630 and communicate the last hidden state 630 to generator 605. The last hidden state 630 for a list of GUI components 510 can be, for example, a final output of the LSTM ANN layer of encoder 610 after processing that sequence of GUI components 510. In this regard, in an LSTM ANN, each input in the sequence is processed by the network, and the hidden state of the LSTM layer is updated at each time step. The final hidden state of the LSTM layer after processing the entire sequence is known as the last hidden state.

Generator 605 can comprise, for example, LSTM ANN, which can be trained using machine learning and AI. For target function 330 for prototype GUI 255, generator 605 can receive a function-category vector (e.g., a one-hot encoding vector). Generator 605 also can receive from encoder 610 the last hidden state 630 for a list of GUI components 510. For a list of GUI components 510, generator 605 can concatenate the function-category vector and last hidden state 630 to obtain an initial hidden state of generator 605. Based on the initial hidden state of generator 605, generator 605 can sample existing execution-steps (each execution-step can be represented as an execution-step vector, such as a one-hot encoding vector) to generate execution-step sequence 505. During an inference phase (e.g., when used with GUI 205), generator 605 can output 635 the generated execution-step sequence 505.

During training of FESGAN 210, FESGAN 210 also can utilize discriminator 620 and classifier 625. Discriminator 620 can comprise a convolutional neural network (CNN) trained using machine learning and AI. The CNN can have a highway structure similar to a SeqGAN's highway structure. Discriminator 620 can receive from generator 605 the generated execution-step sequence 505, which may be referred to as a "fake sequence" for training purposes. Discriminator 620 also can receive from data table(s) 220 a real execution-step sequence 645. Discriminator 620 can distinguish between real execution-step sequence 645 and generated execution-step sequence 505.

Discriminator 620 can output information 650 indicating which sequence is the real execution-step sequence 645 and which sequence is the generated execution-step sequence 505 (fake). Discriminator also can output an identified function 655 (e.g., function classification/category of identified software function), which can be target function 330.

Classifier 625 can comprise a dual-LSTM ANN trained to receive component vector sequence 660 generated from a fake sequence (e.g., generated execution-step sequence 505) and receive a component vector sequence 665 for GUI components 510 depicted in a prototype GUI 255, and output data 670 indicating subset relationships. Specifically, data 670 can indicate whether all of the GUI components (represented by generated component vector sequence 660) executed by the steps contained in the generated execution-step sequence 505 corresponding to GUI components 510 are a subset of the GUI components represented by the prototype component vector sequence 665.

Figures 7, 8:
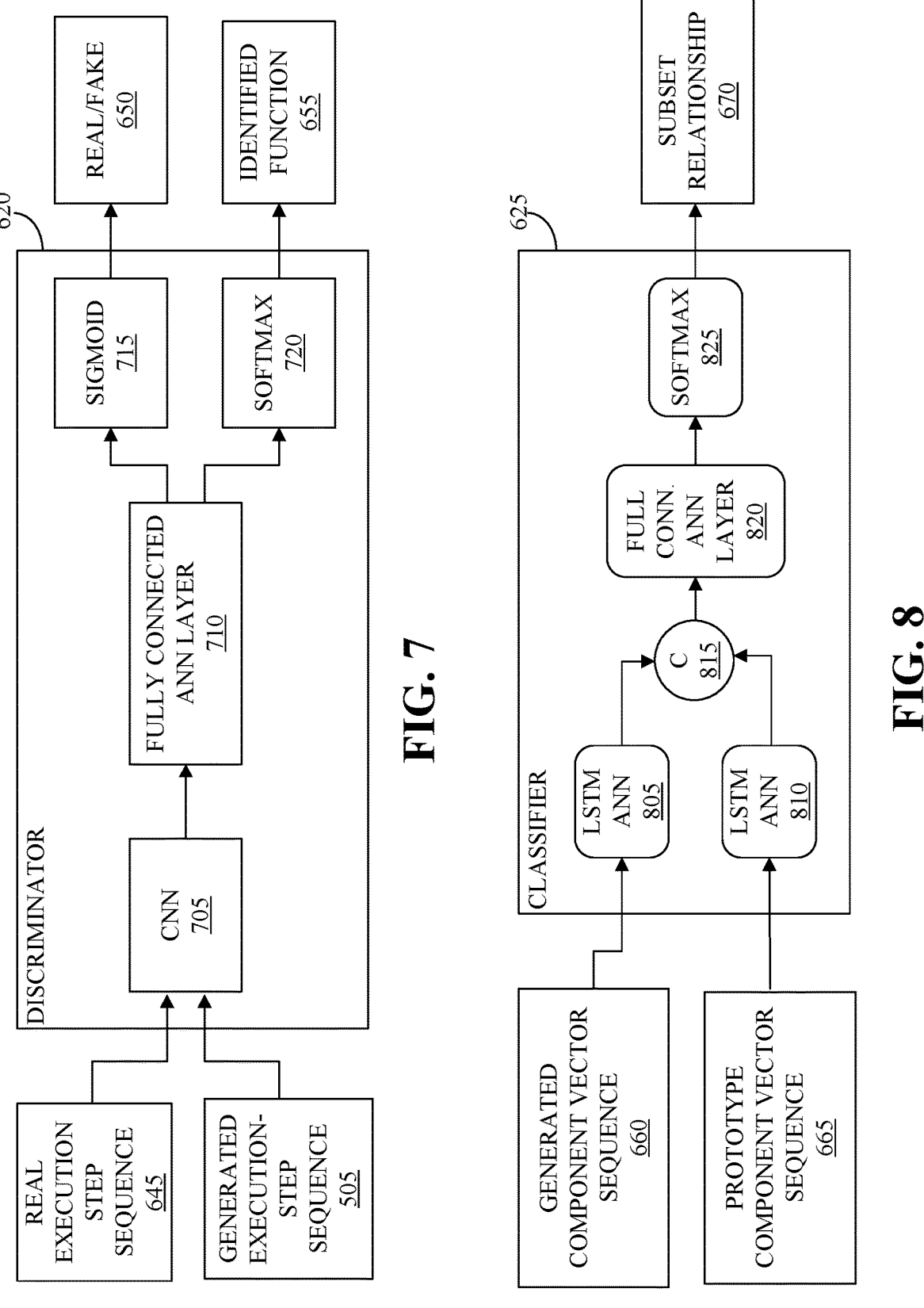
FIG. 7 is a block diagram illustrating example architecture of a discriminator.
FIG. 8 is a block diagram illustrating example architecture of a classifier.

FIG. 7 is a block diagram illustrating example architecture of discriminator 620. As noted, discriminator can receive real execution-step sequence 645 and generated execution-step sequence 505. Discriminator 620 can include a convolutional neural network (CNN) 705 that is added with a highway architecture based on the pooled feature maps.

Discriminator 620 also can include a fully connected ANN layer 710. Fully connected ANN layer 710 can apply a linear transformation to input vectors using a weights matrix. Fully connected ANN layer 710 can output a vector corresponding to an input vector from CNN 705. Discriminator 620 also can include a sigmoid function 715. Sigmoid function 715 can be configured to predict a probability that an execution-step sequence is real or fake, and output corresponding information 650. Discriminator also can include a softmax function 720. Softmax function 720 can transform raw outputs of fully connected ANN layer 710 for the classification of an input execution-step sequence's function category, and output identified function 655 (e.g., function classification/category of identified software function).

FIG. 8 is a block diagram illustrating example architecture of classifier 625. As noted, classifier can receive generated component vector sequence 660 and prototype component vector sequence 665. Generated component vector sequence 660 can be input to a LSTM ANN 805, which can process generated component vector sequence 660 to output a vector (i.e., the last hidden state corresponding to generated component vector sequence 660). Prototype component vector sequence 665 can be input to a LSTM ANN 810, which can process prototype component vector sequence 665 to output a vector (i.e., the last hidden state corresponding to prototype component vector sequence 665). A concatenator 815 can concatenate the outputs of LSTM ANN 805 and LSTM ANN 810, and communicate a result of the concatenation to a fully connected ANN layer 820. Fully connected ANN layer 820 can apply a linear transformation to input vectors using a weights matrix to output a vector corresponding to an input vector. Output of fully connected ANN layer 820 can be fed to a softmax function 825. Softmax function 825 can process the output of fully connected ANN layer 820 to generate subset relationship data 670.

Figure 9:
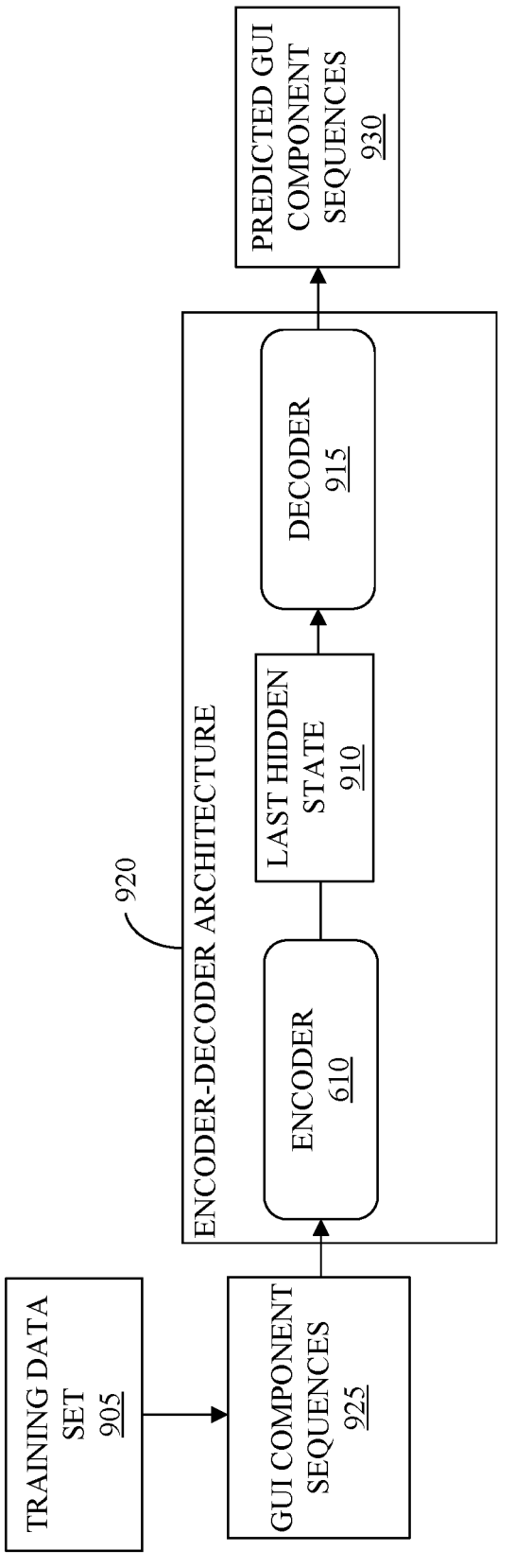
FIG. 9 is a flow diagram illustrating example architecture for training an FESGAN encoder using machine learning.

FIG. 9 is a flow diagram illustrating example architecture for training the FESGAN 210 encoder 610 using machine learning and AI.

Training data sets 905 for training FESGAN can be stored in persistent storage 113. To train encoder 610, function simulator 200 can replicate encoder 610 to obtain a decoder 915. Decoder 915 can comprise a LSTM ANN. Function simulator 200 can configure decoder 915 to receive the last hidden state 910 of encoder as an initial hidden state of decoder 915. Function simulator 200 can combine encoder 610 and decoder 915 to compose an encoder-decoder architecture 920, which can take a GUI component sequence 925 from training data set 905 and output a predicted GUI component sequence 930. Function simulator 200 can use autoregressive language modeling to train encoder-decoder architecture 920 using training data based on a plurality of lists composed of GUI components in a same GUI window, and provided by the same training data set. Auto-regressive language modeling is a type of language modeling that involves predicting the likelihood of the next word or sequence of words in a sentence, given the preceding words in that sentence. In illustration, function simulator 200 can determine cross-entropy loss to determine differences (i.e., errors) between a predicted GUI component sequence 930 and GUI component sequence 925. Function simulator 200 can use backpropagation to update ANN weighting parameters of encoder 610 and decoder 915 based on the cross-entropy loss to minimize the errors, thereby training encoder 610 and decoder 915. Decoder 915 need only be used during training of encoder 610, however, and can be disabled after encoder 610 is trained. Decoder 915 can be reactivated for future training of encoder 610 if desired.

Figures 10, 11:
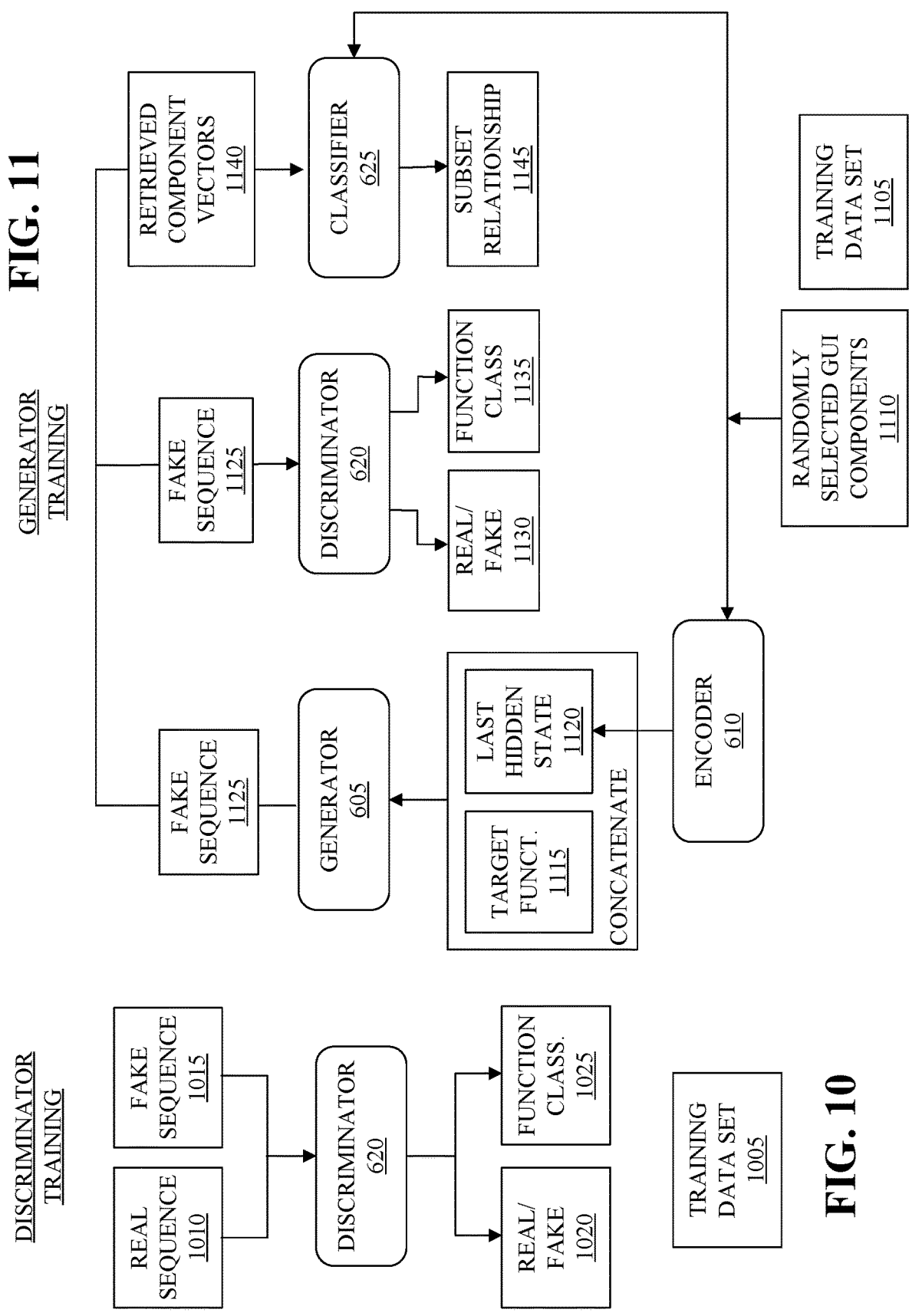
FIG. 10 is a flow diagram illustrating example architecture for training an FESGAN discriminator using machine learning.
FIG. 11 is a flow diagram illustrating example architecture for training an FESGAN generator using machine learning.

FIG. 10 is a flow diagram illustrating example architecture for training the FESGAN 210 discriminator 620 using machine learning and AI.

Initially, discriminator 620 be pre-trained. To pre-train discriminator 620, function simulator 200 can determine cross-entropy loss based on randomly selected real execution-step sequences from a training data set 1005, which may be stored in persistent storage 113, and the generated execution-step sequences from the pre-trained generator 605. In addition, function simulator 200 can determine cross-entropy loss for discriminator's identified function based on a related function category information from the training data set 1005. The function category information can correspond to those selected real execution-step sequences. Function simulator 200 can use backpropagation to update ANN weighting parameters of discriminator 620 to minimize the cross-entropy loss.

Function simulator 200 can further train discriminator using adversarial training implementing real execution-step sequences ("real sequences") 1010 and fake execution-step sequences ("fake sequences") 1015. In this example, fake sequences 1015 are execution-step sequences generated by generator 605. Real sequences 1010 can be accessed from training data set 1005. Discriminator 620 can process real sequences 1010 and fake sequences 1015, as previously described, and output information 1020 indicating which sequence is the real sequence 1010 and which sequence is the fake sequence 1015. Discriminator also can output an identified function 1025 (e.g., function classification/category of identified software function), which can be target function 330. Function simulator 200 can compare the results of outputs 1020, 1025 to the real sequence 1010 and fake sequence 1015 to determine cross-entropy loss, and further use backpropagation to update ANN weighting parameters of discriminator 620 to minimize the cross-entropy loss. Adversarial training can repeat/continue until a desired performance of discriminator 620 is achieved using real sequences 1010 and fake sequences 1015.

FIG. 11 is a flow diagram illustrating example architecture for training the FESGAN 210 generator 605 using machine learning and AI.

Initially, generator 605 and classifier 625 can be pre-trained. To pre-train generator 605, FESGAN 210 can use maximum likelihood estimation (MLE) based on a plurality of execution-step sequences from a training data set 1105, stored in persistent storage 113, and determine cross-entropy loss to determine errors in the generator's output. Function simulator 200 can use backpropagation to update ANN weighting parameters of generator 605 to minimize generator 605 output errors.

To pre-train classifier 625, FESGAN 210 can randomly select a set of GUI components (represented as component vectors) from the training data set 1105 to compose a GUI component sequence, and then duplicate that GUI component sequence and make some random changes (e.g. add/delete/duplicate GUI components, change GUI component order, etc.). Function simulator 200 can communicate those sequences into classifier 625. If the duplicated sequence includes any component not belonging to the source sequence, a training label can be dynamically set to be 0, indicating a non-subset relationship. Otherwise, the label can be set to be 1, indicating a subset relationship. Function simulator 200 can determine cross-entropy loss based on the training labels, and use backpropagation to update ANN weighting parameters of classifier 625 to minimize cross-entropy loss.

Discriminator 620 can be trained as described for FIG. 10.

Function simulator 200 can further train generator 605 using adversarial training. Function simulator 200 can access randomly selected GUI components 1110 from training data set 1105 and communicate randomly selected GUI components 1110 to encoder 610 and classifier 625. Randomly selected GUI components 1110 can include, for example, a first set of GUI components comprising 80%-100% of GUI components included in a same GUI window corresponding to a training execution-step sequence or segment. In addition, randomly selected GUI components 1110 can include a second set of GUI components comprising a plurality (e.g., less than a threshold number) of GUI components belonging to different GUI windows.

Function simulator 200 also can select from training data set 1105 a target function 1115, represented as a function-category vector, corresponding to first set of GUI components. Encoder 610 can process randomly selected GUI components 1110 to represent each randomly selected GUI component 1110 as a GUI-component vector and output a last hidden state 1120, as previously described in FIG. 6. Function simulator 200 can concatenate the target function 1115 and last hidden state 1120, and communicate the concatenated target function 1115/last hidden state 1120 to generator 605.

Generator 605 can attempt to generate an execution-step sequence ("fake sequence") 1125 indistinguishable from a real execution-step sequence and classifiable as a target function by discriminator 620. Generator 605 also can attempt to generate fake sequence 1125 such that all GUI components represented by retrieved component vectors 1140, which are executed by a generated execution-step sequence (i.e., fake sequence 1125), are identified as a subset of all GUI components communicated to encoder 610 by classifier 625.

Discriminator 620 can process fake sequences 1125, as previously described, and output information 1130 indicating whether the fake sequence 1125 is the real or fake. Discriminator 620 also can output an identified function 1135 (e.g., function classification/category of identified software function) determined by discriminator 620 for fake sequence 1125.

Further, classifier 625 can retrieve from fake sequence 1125 a component vector 1140 for each GUI component in fake sequence 1125. For example, classifier 625 can include or otherwise use a component process module (not shown) to retrieve component vectors 1140 from fake sequence 1125. Classifier can output data 1145 indicating a subset relationship. Specifically, output 1145 can indicate whether all of the GUI components (represented by the retrieved component vectors 1140) that are executed by the steps contained in a generated execution-step sequence (i.e., fake sequence 1125) are a subset of the randomly selected GUI components 1110.

Figure 12:
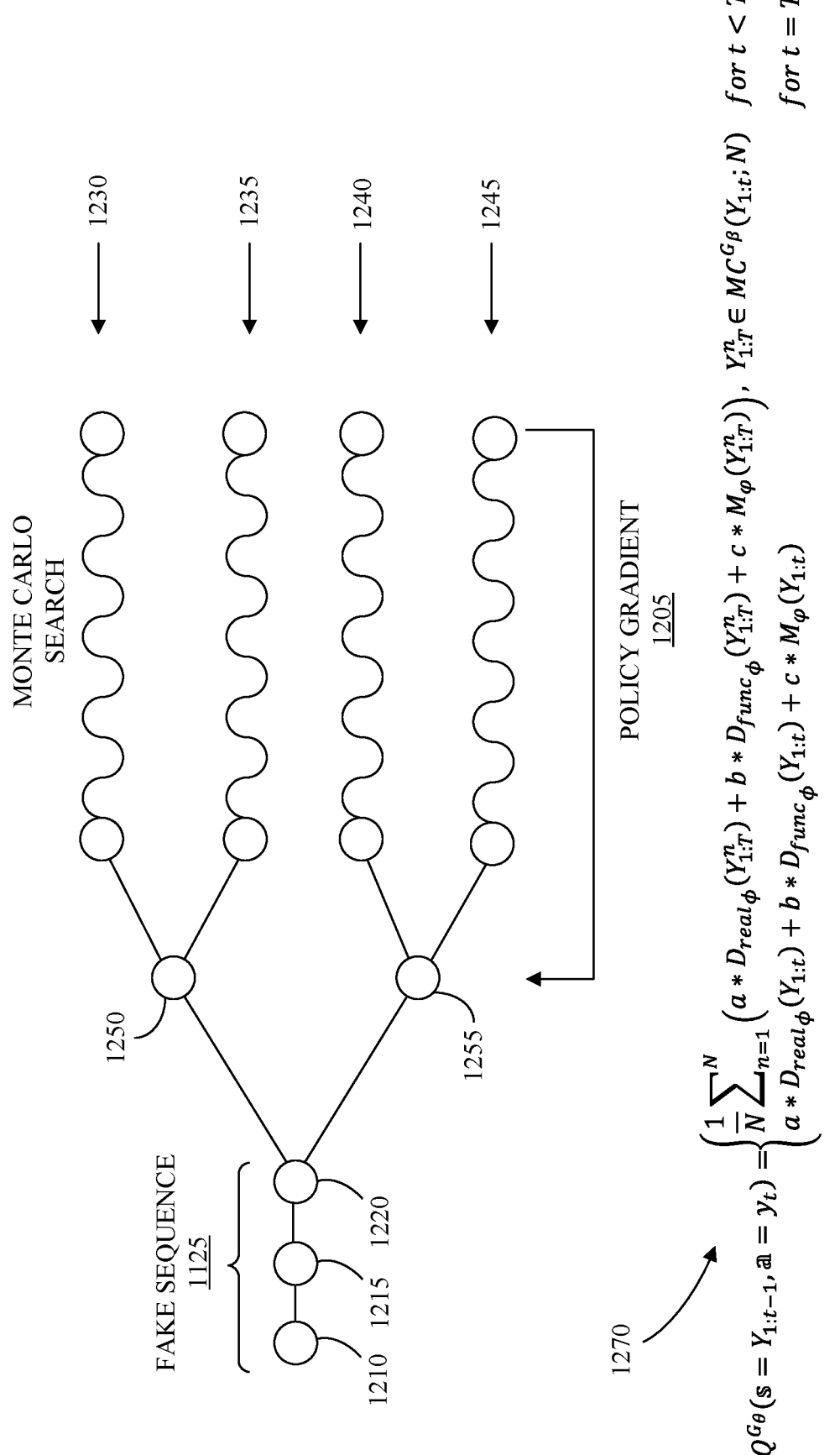
FIG. 12 depicts an example of a policy gradient which may be used to update artificial neural network (ANN) parameters of a generator during machine learning training.

Based on the outputs 1130, 1135 of discriminator 620 and output 1145 of classifier 625, FESGAN 210 can use a policy gradient to update ANN weighting parameters of generator 605, for example as described in FIG. 12. The adversarial training process can repeat/continue until FESGAN 210 converges to a desired level of performance.

FIG. 12 depicts an example of a policy gradient 1205 which FESGAN 210 may execute for training of generator 605 during machine learning training (e.g., adversarial training). Policy gradient is a technique used in reinforcement learning. To update the parameters of generator 605 using policy gradient, a final reward signal can be used to evaluate the quality of the generated execution-step sequences. The generator's objective is to maximize this final reward, so the policy gradient update pushes the generator's parameters in the direction that produces higher rewards (i.e., better generated sequences). The policy gradient algorithm updates the generator's parameters by following the gradient of the expected reward with respect to the generator's parameters. Specifically, the update is given by: $\Delta\theta = \alpha\, \nabla\theta\, \log\, \pi\theta(x)R$, where $\Delta\theta$ is the change in the generator's parameters, $\alpha$ is the learning rate, $\nabla\theta$ is the gradient with respect to the generator's parameters, $\log\, \pi\theta(x)$ is the log probability of generating a sequence x given the generator's parameters, and R is the final reward signal.

Function simulator 200 can identify fake sequence 1125. In this example, fake sequence 1125 can include executable-steps 1210, 1215, 1220, and may include additional execution-steps (not shown). Policy gradient 1205 can generate a plurality of execution-step sequences from fake sequence 1125. For example, policy gradient 1205 can generate N execution-step sequences of length T (e.g., execution-step sequences 1230, 1235, 1240, 1245) based on generated execution-steps as state (e.g., steps 1210, 1215, 1220) and a generated execution-step as action 1250, 1255 using Monte Carlo Search. T indicates the maximum length of generated execution-step sequences from generator 605.

Function simulator 200 can communicate each of the execution-step sequences 1230, 1235, 1240, 1245 to discriminator 620 and classifier 625. For each execution-step sequence 1230, 1235, 1240, 1245, discriminator 620 can generate respective outputs 1130, 1135, and classifier 625 can generate respective outputs 1145. Outputs 1130, 1135, 1145 can be output as the respective reward signals provided by discriminator 620 and classifier 625. Those reward signals can be calculated by an action-value function to obtain a final reward signal. Equation 1270 is an example of an action-value function for a generated execution-step sequence. In equation 1270:

$$D_{real_{\phi}}(Y_{1:T}^{n})$$

is the estimated probability, determined by discriminator 620, of an execution-step sequence being real, and output as a reward.

$$D_{func_{\phi}}(Y_{1:T}^{n})$$

is the estimated probability, determined by discriminator 620, of the correct target function being identified, and output as a reward.

$$M_{\psi}(Y_{1:T}^{n})$$

is the estimated probability, determined by classifier 625, of the correct GUI component subset relationship in the execution-step sequence being identified, and output as a reward.

T indicates the maximum length of generated execution-step sequences from generator 605.

a, b and c are hyper-parameters that control the relative importance factors, respectively, and a+b+c=1. By way of example, the following values can be used: a=0.3, b=0.2 and c=0.5.

Figure 13:
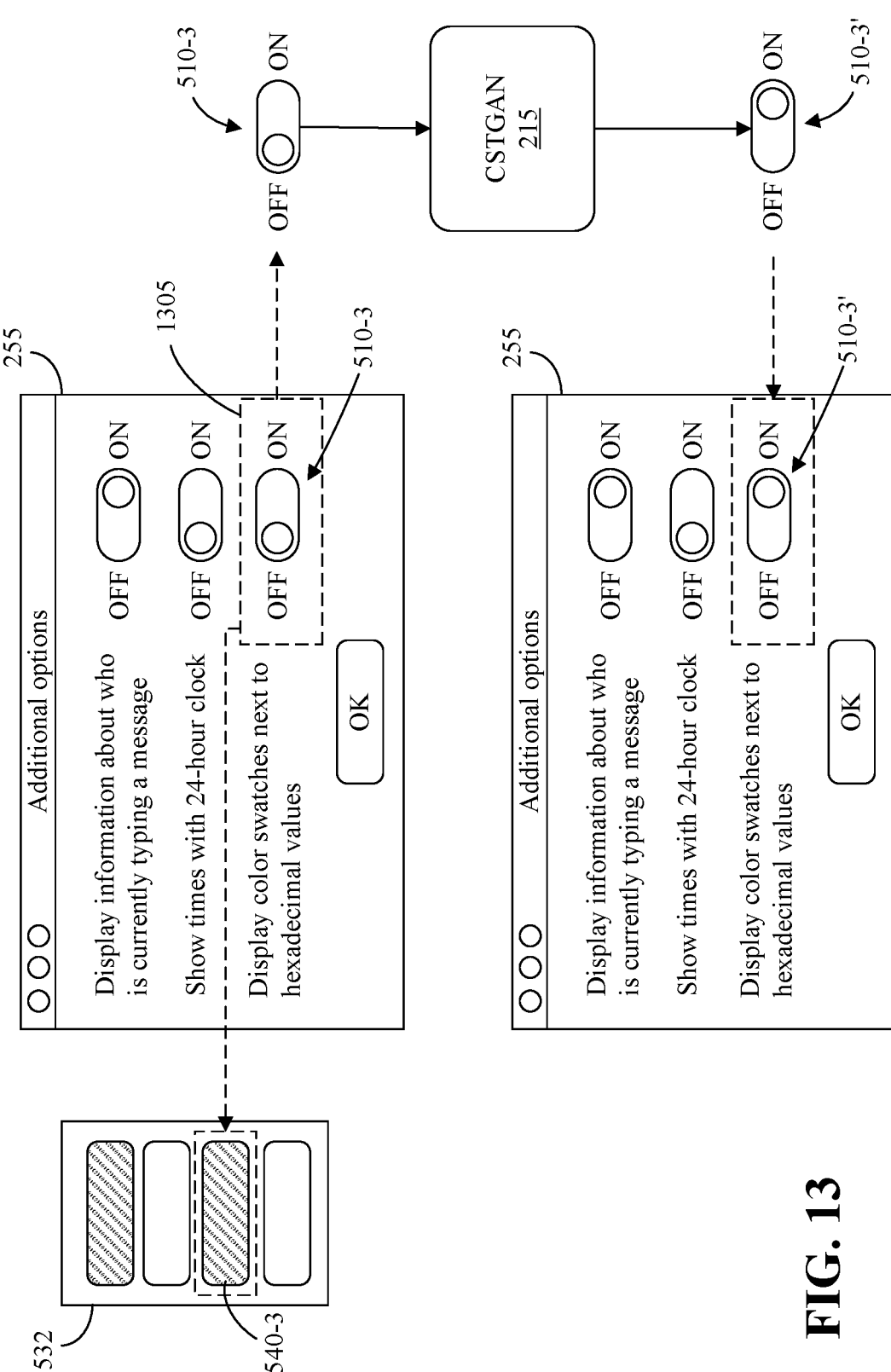
FIG. 13 depicts an example flow diagram for redrawing a prototype GUI.

FIG. 13 depicts an example flow diagram for redrawing prototype GUI 255. In this example, assume the GUI component 510-3 is in an "OFF" state, as indicated by field 540-3 in component status table 532. Also assume GUI component 510-3 is selected by the user, e.g., to change the switch from "OFF" to "ON." Responsive to function simulator 200 detecting the user selection, e.g., via prototype GUI panel 310, function simulator 200 can update field 540-3 to reflect that new state of the GUI component 510-3. Function simulator 200 communicate to CSTGAN 215 the pixel area 1305 depicting GUI component 510-3 in prototype GUI 255. Function simulator 200 also can communicate to CSTGAN 215 the component status table 532 reflecting the new state of the GUI component 510-3.

CSTGAN 215 can redraw GUI component 510-3 to reflect the new state (e.g., "ON"), resulting in revised GUI component 510-3'. Specifically, CSTGAN 215 can redraw GUI component 510-3 in prototype GUI 255, thus updating prototype GUI 255 to depict revised GUI component 510-3' in place of GUI component 510-3.

Figure 14:
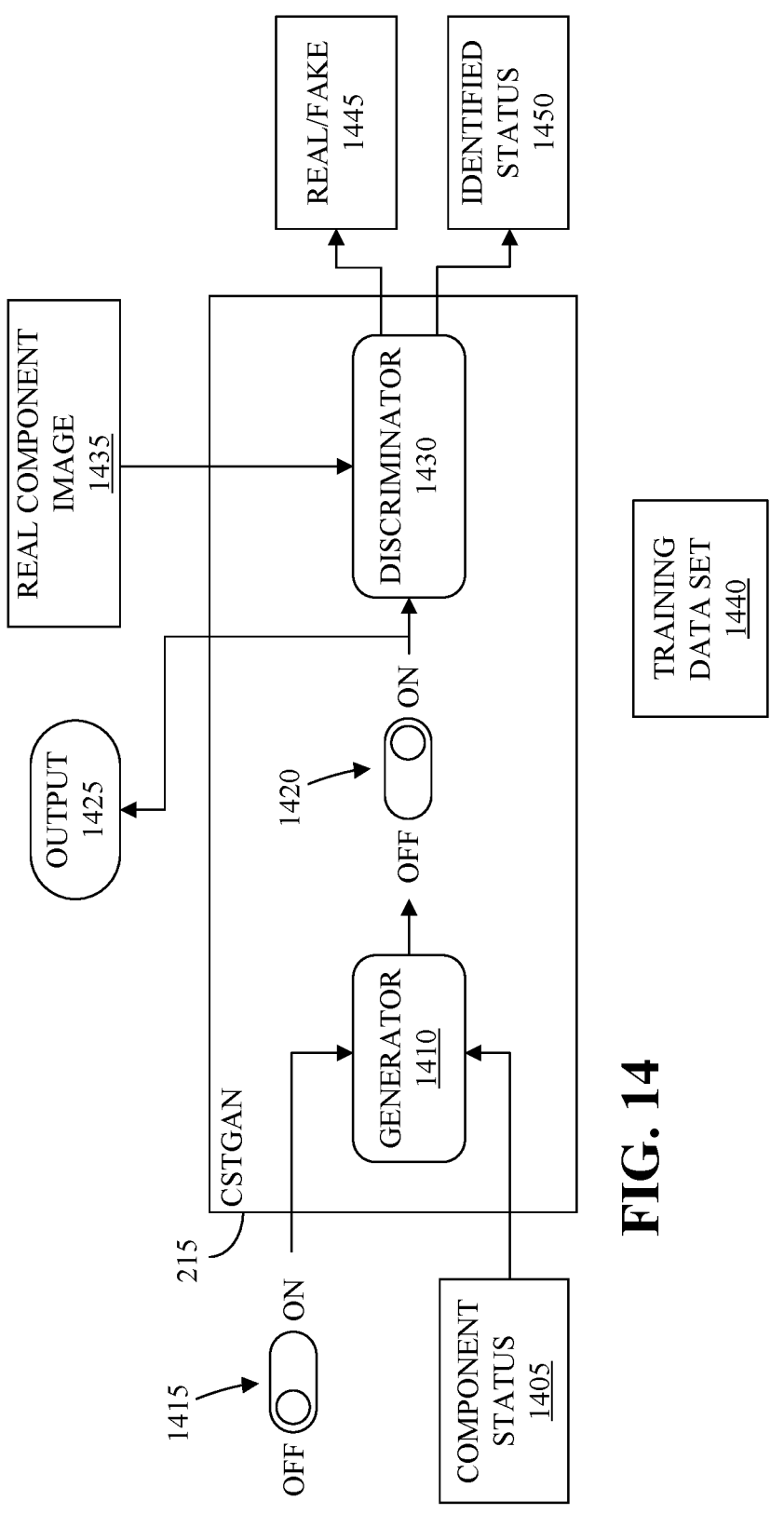
FIG. 14 is a block diagram illustrating an example of Component Status Transition Generative Adversarial Networks (CSTGAN).

FIG. 14 is a block diagram illustrating an example of CSTGAN 215. CSTGAN 215 can be based on StarGAN, which are unified generative adversarial networks for multi-domain image-to-image translation. CSTGAN 215, however, adds addition functionality based on a component status 1405 and an additional output 1450 for identified status.

CSTGAN 215 can include a generator 1410. Generator 1410 can comprise, for example, two convolutional layers with the stride size of two for downsampling, six residual blocks, and two transposed convolutional layers with the stride size of two for upsampling, which can be trained using machine learning and AI. Generator 1410 can be configured to receive an image 1415 of a GUI component (e.g., component 510-3) and change that image 1415 to generate an image 1420 of the GUI component in another state (e.g., GUI component 510-3'). Generator 1410 can change the image 1415 based on a component status 1405 generator 1410 receives for the GUI component (e.g., GUI component 510-3). Component status 1405 can be, for example, a one-hot encoding vector indicating the expected component status (e.g., a component received or cleared user input). Component status 1405 can be indicated, for example, by field 540-3 of component status table 532 for the executable-step 522 in which a software function assigned to GUI component 510-3 is executed. During an inference phase (e.g., when used with GUI 205), generator 1410 can output 1425 the generated image 1420 for use in redrawing prototype GUI 255.

CSTGAN also can include a discriminator 1430 which CSTGAN 215 can use to train generator 1410. Discriminator 1430 can comprise a CNN trained using machine learning and AI. Discriminator 1430 can receive generated image 1420 or receive a real component image 1435, for example from a training data set 1440, which can be stored to persistent storage 113. Discriminator 1430 can distinguish between real component image 1435 and generated image 1420 and output indicators 1445 indicating whether the images 1420, 1435 are real or generated (fake). Discriminator 1430 also can identify the status classification/category of GUI components represented by each image 1420, 1435 and output indicators 1450 indicating the identified status.

Figures 15, 16:
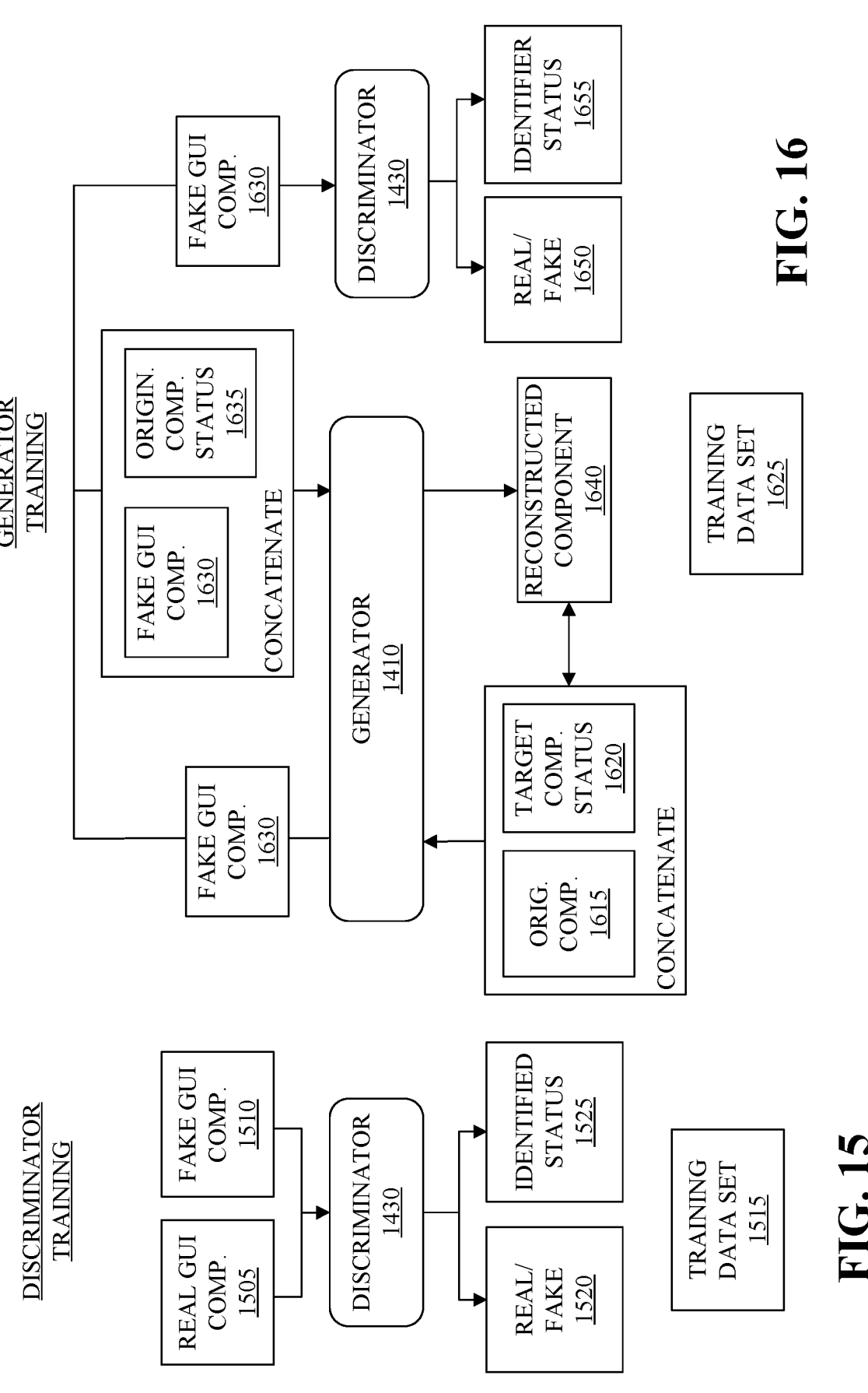
FIG. 15 is a flow diagram illustrating example architecture for training an CSTGAN discriminator using machine learning.
FIG. 16 is a flow diagram illustrating example architecture for training an CSTGAN generator using machine learning.

FIG. 15 is a flow diagram illustrating example architecture for training an CSTGAN discriminator 1430 using machine learning and AI. Function simulator 200 can provide to discriminator 1430 real GUI component images 1505 accessed from a training data set 1515, which may be stored in persistent storage 113, or generated (fake) GUI component images 1510 from generator 1410. Discriminator 1430 can process real GUI component images 1505 or fake GUI component images 1510 and output information for a component image, for example one image at a time. Output 1520 can indicate whether a GUI component image is real or fake and information 1525 can indicate the status of each GUI component identified by discriminator 1430. Function simulator 200 can compare the results of outputs 1520, 1525 to the real GUI component images 1505 and fake GUI component images 1510 to determine cross-entropy loss, and further use backpropagation to update ANN weighting parameters of discriminator 1430 to minimize the cross-entropy loss. Adversarial training can repeat/continue until a desired performance of discriminator 1430 at distinguishing between real GUI component images 1505 and fake GUI component images 1510 and at identifying target component status is achieved.

FIG. 16 is a flow diagram illustrating example architecture for training an CSTGAN generator 1410 using machine learning and AI.

CSTGAN 215 can access an original GUI component image 1615 and a target component-status vector 1620, for example from a training data set 1625, which may be stored in persistent storage 113. CSTGAN 215 can spatially replicate target component-status vector 1620 and depth-wise concatenate the replicated target component-status vector 1620 with original GUI component image 1615. Generator 1410 can receive and process the concatenation of original GUI component image 1615 and replicated target component-status vector 1620 to generate a fake GUI component image 1630.

CSTGAN 215 access an original component-status vector 1635 from training data set 1625, and spatially replicate original component-status vector 1635. CSTGAN 215 can depth-wise concatenate the replicated original component-status vector 1635 with fake GUI component image 1630. Generator 1410 can receive and process the concatenation of fake GUI component image 1630 and replicated original component-status vector 1635 to generate a reconstructed GUI component image 1640. A reconstruction loss between the reconstructed GUI component image 1640 and the original GUI component image 1615 can be determined. Such reconstruction loss can be part of a total loss, other losses can be provided by discriminator 1430 (i.e., cross-entropy loss) that is used for updating the parameters of the generator 1410.

Discriminator 1430 also can receive and process the fake GUI component image 1630. Discriminator 1430 can output an indicator 1650 indicating whether fake GUI component image 1630 real or generated (fake). Discriminator 1430 also can identify the status classification/category of the GUI component represented by fake GUI component image 1630 and output an indicator 1655 indicating the identified status. Function simulator 200 can determine cross-entropy loss based on whether generator 1410 is able to generate GUI component images that are indistinguishable from real images and identified as target component statuses, and use backpropagation to update ANN weighting parameters of generator 1410 to minimize the cross-entropy loss and the reconstruction loss. Adversarial training can repeat/continue until a desired performance of generator 1410 at generating images indistinguishable from real images and identified as target component statuses is achieved.

FIG. 17 is a flowchart illustrating an example of a method 1700 of facilitating user interaction with a graphical user interface. Method 1700 can be implemented by function simulator 200.

At step 1705 function simulator 200 can determine an execution-step sequence for a first graphical user interface At step 1710 function simulator 200 can present a second graphical user interface, the second graphical user interface comprising: a first panel in which the first graphical user interface is presented; a second panel comprising a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed.

At step 1715 function simulator 200 can, responsive to the user selecting the first user selectable component, execute an execution-step in the execution-step sequence, visually depict a result of the executing the execution-step by redrawing the first graphical user interface, and add to the third panel component status data indicating the execution-step in the execution-step sequence that was executed.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer imple- mented process, such that the instructions which execute on the computer, other programmable apparatus, or other device implement the functions/acts specified in the flow- chart and/or block diagram block or blocks.

The flowchart and block diagrams in the Figures illustrate the architecture, functionality, and operation of possible implementations of systems, methods, and computer pro- gram products according to various embodiments of the present invention. In this regard, each block in the flowchart or block diagrams may represent a module, segment, or portion of instructions, which comprises one or more executable instructions for implementing the specified logi- cal function(s). In some alternative implementations, the functions noted in the blocks may occur out of the order noted in the Figures. For example, two blocks shown in succession may, in fact, be accomplished as one step, executed concurrently, substantially concurrently, in a par- tially or wholly temporally overlapping manner, or the blocks may sometimes be executed in the reverse order, depending upon the functionality involved. It will also be noted that each block of the block diagrams and/or flowchart illustration, and combinations of blocks in the block dia- grams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this dis- closure, specify the presence of stated features, integers, steps, operations, elements, and/or components, but do not preclude the presence or addition of one or more other features, integers, steps, operations, elements, components, and/or groups thereof.

The terminology used herein is for the purpose of describ- ing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this dis- closure, specify the presence of stated features, integers, steps, operations, elements, and/or components, but do not preclude the presence or addition of one or more other features, integers, steps, operations, elements, components, and/or groups thereof.

Reference throughout this disclosure to "one embodi- ment," "an embodiment," "one arrangement," "an arrange- ment," "one aspect," "an aspect," or similar language means that a particular feature, structure, or characteristic described in connection with the embodiment is included in at least one embodiment described within this disclosure. Thus, appearances of the phrases "one embodiment," "an embodi- ment," "one arrangement," "an arrangement," "one aspect," "an aspect," and similar language throughout this disclosure may, but do not necessarily, all refer to the same embodi- ment.

The term "plurality," as used herein, is defined as two or more than two. The term "another," as used herein, is defined as at least a second or more. The term "coupled," as used herein, is defined as connected, whether directly with- out any intervening elements or indirectly with one or more intervening elements, unless otherwise indicated. Two ele- ments also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various ele- ments, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector proces- sor, a digital signal processor (DSP), a field-programmable gate array (FPGA), a programmable logic array (PLA), an application specific integrated circuit (ASIC), program- mable logic circuitry, and a controller.

As defined herein, the term "server" means a data pro- cessing system configured to share services with one or more other data processing systems.

As defined herein, the term "real time" means a level of processing responsiveness that a user or system senses as sufficiently immediate for a particular process or determi- nation to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means with- out user intervention.

As defined herein, the term "user" means a person (i.e., a human being).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, using a processor, an execution-step sequence for a first graphical user interface, wherein determining the execution-step sequence comprises:

determining, by an encoder of a Generative Adversarial Network (GAN) and using one or more components of the first graphical user interface, a hidden state associated with the one or more components; and determining, by a generator of the GAN and using the hidden state and a target function, the execution-step sequence;

presenting a second graphical user interface, the second graphical user interface comprising:

a first panel in which the first graphical user interface is presented;

a second panel comprising a first user selectable component via which a user navigates forward in the execution-step sequence for the first graphical user interface and a second user selectable component via which the user navigates backward in the execution-step sequence for the first graphical user interface; and a third panel configured to represent a plurality of execution-steps of the execution-step sequence that are executed, wherein the first panel, the second panel, and the third panel are separate and distinct; and responsive to the user selecting the first user selectable component:

executing an execution-step in the execution-step sequence;

visually depicting a result of the executing the execution-step by redrawing the first graphical user interface; and adding component status data to the third panel, wherein the component status data indicates, for the execution-step:

an action associated with the execution-step; and a particular component of the one or more components on which the action was performed.

2. The method of claim 1, wherein the redrawing the first graphical user interface comprises:

redrawing a graphical user interface component, of the first graphical user interface, pertaining to the execution-step in the execution-step sequence that was executed.

3. The method of claim 2, wherein the redrawing the graphical user interface component comprises redrawing the graphical user interface component using Component Status Transition Generative Adversarial Networks trained using machine learning.

4. The method of claim 1, further comprising:

responsive to the user selecting the second user selectable component, removing from the third panel the component status data indicating the execution-step in the execution-step sequence that was executed responsive to the user selecting the first user selectable component.

nent status data indicating the execution-step in the execution-step sequence that was executed responsive to the user selecting the first user selectable component.

5. The method of claim 1, wherein the determining the execution-step sequence for the first graphical user interface comprises determining the execution-step sequence using Function Execution-step Generative Adversarial Networks trained using machine learning.

6. The method of claim 1, further comprising:

generating a component status table for each execution-step in the execution-step sequence, each component status table tracking status of graphical user interface components of the first graphical user interface at the respective execution-step.

7. The method of claim 1, wherein:

the second panel comprises a third user selectable component; and responsive to the user selecting the third user selectable component, permitting the user to tune the execution-steps of the execution-step sequence.

8. The method of claim 1, further comprising:

outputting content comprising a plurality of execution-steps of the execution-step sequence and, for each of the plurality of execution-steps, a respective image of the first graphical user interface corresponding to that execution-step and depicting the first graphical user interface in a state resulting from that execution-step.

9. A system, comprising:

a processor programmed to initiate executable operations comprising:

determining an execution-step sequence for a first graphical user interface, wherein determining the execution-step sequence comprises:

determining, by an encoder of a Generative Adversarial Network (GAN) and using one or more components of the first graphical user interface, a hidden state associated with the one or more components; and determining, by a generator of the GAN and using the hidden state and a target function, the execution-step sequence;

presenting a second graphical user interface, the second graphical user interface comprising:

a first panel in which the first graphical user interface is presented;

a second panel comprising a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed, wherein the first panel, the second panel, and the third panel are separate and distinct; and responsive to the user selecting the first user selectable component:

executing an execution-step in the execution-step sequence;

visually depicting a result of the executing the execution-step by redrawing the first graphical user interface; and adding component status data to the third panel, wherein the component status data indicates, for the execution-step:

an action associated with the execution-step; and a particular component of the one or more components on which the action was performed.

10. The system of claim 9, wherein the redrawing the first graphical user interface comprises:

redrawing a graphical user interface component, of the first graphical user interface, pertaining to the execution-step in the execution-step sequence that was executed.

11. The system of claim 10, wherein the redrawing the graphical user interface component comprises redrawing the graphical user interface component using Component Status Transition Generative Adversarial Networks trained using machine learning.

12. The system of claim 9, the executable operations further comprising:

responsive to the user selecting the second user selectable component, removing from the third panel the component status data indicating the execution-step in the execution-step sequence that was executed responsive to the user selecting the first user selectable component.

13. The system of claim 9, wherein the determining the execution-step sequence for the first graphical user interface comprises determining the execution-step sequence using Function Execution-step Generative Adversarial Networks trained using machine learning.

14. The system of claim 9, the executable operations further comprising: generating a component status table for each execution-step in the execution-step sequence, each component status table tracking status of graphical user interface components of the first graphical user interface at the respective execution-step.

15. The system of claim 9, wherein:

the second panel comprises a third user selectable component; and responsive to the user selecting the third user selectable component, permitting the user to tune the execution-steps of the execution-step sequence.

16. The system of claim 9, the executable operations further comprising: outputting content comprising a plurality of execution-steps of the execution-step sequence and, for each of the plurality of execution-steps, a respective image of the first graphical user interface corresponding to that execution-step and depicting the first graphical user interface in a state resulting from that execution-step.

17. A computer program product, comprising:

one or more computer readable storage mediums having program code stored thereon, the program code stored on the one or more computer readable storage mediums collectively executable by a data processing system to initiate operations including:

determining an execution-step sequence for a first graphical user interface, wherein determining the execution-step sequence comprises:

determining, by an encoder of a Generative Adversarial Network (GAN) and using one or more components of the first graphical user interface, a hidden state associated with the one or more components; and determining, by a generator of the GAN and using the hidden state and a target function, the execution-step sequence;

presenting a second graphical user interface, the second graphical user interface comprising:

a first panel in which the first graphical user interface is presented;

a second panel comprising a first user selectable component via which a user navigates forward in the execution-step sequence for the first graphical user interface and a second user selectable component via which the user navigates backward in the execution-step sequence for the first graphical user interface; and a third panel configured to represent steps of the execution-step sequence that are executed, wherein the first panel, the second panel, and the third panel are separate and distinct; and responsive to the user selecting the first user selectable component:

executing an execution-step in the execution-step sequence;

visually depicting a result of the executing the execution-step by redrawing the first graphical user interface; and adding component status data to the third panel, wherein the component status data indicates, for the execution-step:

an action associated with the execution-step; and a particular component of the one or more components on which the action was performed.

18. The computer program product of claim 17, wherein the redrawing the first graphical user interface comprises:

redrawing a graphical user interface component, of the first graphical user interface, pertaining to the execution-step in the execution-step sequence that was executed.

19. The computer program product of claim 18, wherein the redrawing the graphical user interface component comprises redrawing the graphical user interface component using Component Status Transition Generative Adversarial Networks trained using machine learning.

20. The computer program product of claim 17, wherein the program code is executable by the data processing system to initiate operations further comprising:

responsive to the user selecting the second user selectable component, removing from the third panel the component status data indicating the execution-step in the execution-step sequence that was executed responsive to the user selecting the first user selectable component.

* * * * *